(12) United States Patent
Borgyos et al.

(10) Patent No.: US 12,354,486 B2
(45) Date of Patent: Jul. 8, 2025

(54) SYSTEMS AND METHODS FOR PROVIDING A TRAJECTORY PLANNING ENGINE FOR UNMANNED AIRCRAFT

(71) Applicant: GE Aviation Systems LLC, Grand Rapids, MI (US)

(72) Inventors: Szabolcs A. Borgyos, Grand Rapids, MI (US); Vineet Mehta, Grand Rapids, MI (US); Kenneth Stewart, Somerville, MA (US)

(73) Assignee: GE Aviation Systems LLC, Grand Rapids, MI (US)

( * ) Notice: Subject to any disclaimer, the term of this patent is extended or adjusted under 35 U.S.C. 154(b) by 304 days.

(21) Appl. No.: 17/781,256

(22) PCT Filed: Dec. 4, 2020

(86) PCT No.: PCT/US2020/063273
§ 371 (c)(1),
(2) Date: May 31, 2022

(87) PCT Pub. No.: WO2021/194569
PCT Pub. Date: Sep. 30, 2021

(65) Prior Publication Data
US 2022/0415187 A1 Dec. 29, 2022

Related U.S. Application Data

(60) Provisional application No. 62/943,623, filed on Dec. 4, 2019.

(51) Int. Cl.
*G08G 5/55* (2025.01)
*G08G 5/26* (2025.01)
(Continued)

(52) U.S. Cl.
CPC .............. *G08G 5/55* (2025.01); *G08G 5/26* (2025.01); *G08G 5/34* (2025.01); *G08G 5/57* (2025.01);
(Continued)

(58) Field of Classification Search
CPC .......................... G08G 5/0039; G08G 5/0069
See application file for complete search history.

(56) References Cited

U.S. PATENT DOCUMENTS

| 9,734,723 | B1 * | 8/2017 | Bruno | G08G 5/006 |
| 2015/0323930 | A1 * | 11/2015 | Downey | H04W 48/02 |
| | | | | 701/14 |

(Continued)

FOREIGN PATENT DOCUMENTS

EP 3118840 A1 1/2017

OTHER PUBLICATIONS

International Search Report & Written Opinion dated Oct. 20, 2021 pertaining to PCT Application No. PCT/US2020/063273 filed Dec. 4, 2020, pp. 1-14.

*Primary Examiner* — Imran K Mustafa
(74) *Attorney, Agent, or Firm* — Dinsmore & Shohl LLP

(57) ABSTRACT

Systems and methods for trajectory planning for an unmanned aerial vehicle. A mission specification for fulfillment by an unmanned aerial vehicle is received. The mission specification identifies a waypoint, an optimization criterion, and information identifying the unmanned aerial vehicle. It is determined whether candidate flight trajectories are available. Maneuvers from a motions library that defines available maneuvers are modeled to identify candidate flight trajectories to the waypoint which satisfy a restriction condition and do not conflict with a flight plan for another aerial
(Continued)

vehicle. If candidate flight trajectories are available, desired flight trajectories are selected. A mission approval is submitted to a receiving party.

20 Claims, 17 Drawing Sheets

(51) Int. Cl.
*G08G 5/34* (2025.01)
*G08G 5/57* (2025.01)
*G08G 5/59* (2025.01)
*G08G 5/76* (2025.01)
*G08G 5/80* (2025.01)

(52) U.S. Cl.
CPC ................ *G08G 5/59* (2025.01); *G08G 5/76* (2025.01); *G08G 5/80* (2025.01)

(56) References Cited

U.S. PATENT DOCUMENTS

2017/0069214 A1\* 3/2017 Dupray ................ G08G 5/0008
2022/0270495 A1\* 8/2022 Pele ........................ G05D 1/106

\* cited by examiner

SYSTEMS AND METHODS FOR PROVIDING A TRAJECTORY PLANNING ENGINE FOR UNMANNED AIRCRAFT

CROSS-REFERENCE TO RELATED APPLICATIONS

This application is a National Stage Entry under 35 U.S.C. § 371 of International Patent Application No. PCT/US2020/063273, filed Dec. 4, 2020, which claims priority to U.S. Provisional Application No. 62/943,623 entitled "APPARATUS, SYSTEM, AND METHOD OF PROVIDING A TRAJECTORY PLANNING ENGINE FOR UNMANNED AIRCRAFT," filed on Dec. 4, 2019, which is incorporated herein by reference in its entirety.

TECHNICAL FIELD

The disclosure relates generally to aircraft services, and, more particularly, to an apparatus, system, and method of providing a trajectory planning application for unmanned aerial vehicle.

BACKGROUND

Few technologies today command as much interest and excitement as aerial vehicles, such as unmanned aerial vehicles. While current implementations have included governmental uses, it has been proposed that unmanned aerial vehicles be further expanded into commercial services, such as safety and security, product delivery, real estate and surveys, and so on.

While the growth in applications for aerial vehicles presents economic opportunity, it also presents significant challenges, such as to first responders, safety and security personnel, and to other aerial vehicles that may be monitored by regulatory authorities such as the Federal Aviation Administration (FAA). There is no system in place presently to manage airspace for unmanned aerial vehicles. Similarly, there is no autonomous mechanism to provide an approval process for unmanned aerial vehicle missions, and thus such flights often occur without proper approvals or with incomplete mission plans. Because of this, there may be detrimental impact on aerial vehicles that have approved flight plans, and on first responder or other emergency services activity, stemming from unmanaged, improper, and/or unnecessarily dangerous operation of an unmanned aerial vehicle.

For use of U.S. airspace, the FAA has a registration process (as do some local authorities and agencies), although the approval process typically takes 24 hours or more. For at least this reason, many operators of unmanned aerial vehicles fail to pursue flight plan approvals. Because it is difficult to distinguish an unauthorized unmanned aerial vehicle from an authorized aerial vehicle in a restricted airspace in real time, it is also difficult to punish owners or operators of the unauthorized aerial vehicle. Thus, a need for providing a trajectory planning application for unmanned aerial vehicle exists in the industry.

SUMMARY

Described is a method for providing unmanned aerial vehicle trajectory planning comprising: receiving, by a computing device, a mission specification for fulfillment by an unmanned aerial vehicle, the mission specification identifying at least one waypoint, at least one optimization criterion, and information identifying the unmanned aerial vehicle, determining, by the computing device, whether one or more candidate flight trajectories are available, wherein determining whether or more candidate flight trajectories are available comprises modeling a plurality of maneuvers from a motions library that defines available maneuvers for the unmanned aerial vehicle to identify the one or more candidate flight trajectories to the at least one waypoint which satisfy at least one restriction condition and do not conflict with a flight plan for another aerial vehicle; in response to determining that one or more candidate flight trajectories are available, identifying, by the computing device, one or more desired flight trajectories from the one or more candidate flight trajectories that are determined to be available based on the at least one optimization criterion identified by the mission specification; and issuing, by the computing device, a mission approval that includes a selected flight trajectory of the one of the one or more desired flight trajectories as output to a receiving party.

Also described is a system for providing a trajectory planning application comprising: a remote computing device that includes a processor and a memory component that stores logic that, when executed by the processor, causes the system to perform at least the following: receive a mission specification for fulfillment by an unmanned aerial vehicle, the mission specification identifying at least one waypoint, at least one optimization criteria, and information identifying the unmanned aerial vehicle, determine whether one or more candidate flight trajectories are available, wherein determining that or more candidate flight trajectories are available comprises modeling a plurality of maneuvers from a motions library that defines available maneuvers for the unmanned aerial vehicle to identify the one or more candidate flight trajectories to the at least one waypoint which satisfy at least one restriction condition and do not conflict with a flight plan for at least one other aerial vehicle; in response to determining that one or more candidate flight trajectories are available, identify one or more desired flight trajectories from the one or more candidate flight trajectories that are determined to be available based on the at least one optimization criteria identified by the mission specification; and issue a mission approval that includes a selected flight trajectory of the one of the one or more desired flight trajectories as output to a receiving party.

Further described is a non-transitory computer-readable medium that stores logic that, when executed by a computing device, causes the computing device to perform at least the following: receive a mission specification for fulfillment by an unmanned aerial vehicle, the mission specification identifying at least one waypoint, at least one optimization criteria, and information identifying the unmanned aerial vehicle, determine whether one or more candidate flight trajectories are available, wherein determining that or more candidate flight trajectories are available comprises modeling a plurality of maneuvers from a motions library that defines available maneuvers for the unmanned aerial vehicle to identify the one or more candidate flight trajectories to the at least one waypoint which satisfy at least one restriction condition and do not conflict with a flight plan for at least one other aerial vehicle; in response to determining that one or more candidate flight trajectories are available, identify one or more desired flight trajectories from the one or more candidate flight trajectories that are determined to be available based on the at least one optimization criteria identified by the mission specification; and issue a mission approval that includes a selected flight trajectory of the one of the one or more desired flight trajectories as output to a receiving party.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for providing trajectory planning services for a vehicle. These embodiments may include a trajectory planning application, a flight restriction planner application, and a flight plan deconfliction application. The trajectory planning application may receive a mission specification as input, wherein the mission specification identifies a request for the mission. The trajectory planning application may include a trajectory predictor application that may access an available motions library specific to the unmanned aerial vehicle for which the mission is requested. The flight restriction planner application may identify flight restriction conditions and may be communicative with the trajectory planning application. The flight plan deconfliction application may deconflict the mission with other aerial vehicle flights, wherein the other aerial vehicle flights. In embodiments, the trajectory planning application generates candidate flight trajectories based at least in part on the at least one restriction conditions provided by the flight restriction planner application and information associated with the other aerial vehicle flights identified by the flight plan deconfliction application. The trajectory planning application may further determine whether a suitable trajectory is identified to achieve the mission specification, and in response to determining the suitable trajectory is identified, initiating transmission of the suitable trajectory over a network, and in response to determining the suitable trajectory is not available, initiating transmission of a denial of the request for the mission.

Embodiments described herein may utilize a single user interface or a small number of user interfaces across a plurality of applications and modules integrated with the services architecture. This provides a user with a more cohesive flight planning and monitoring experience. These embodiments may reduce code duplication and back-end processing by providing tunnel access to third party data for services and applications registered to the services architecture. Embodiments may also provide a gateway that limits any cross data flow as between applications or modules, except in circumstances where a user is also an authorized user of each of those independent applications. Some embodiments may reduce the need for independent access to each of a large number of separate applications in order to generate a flight plan and/or to perform flight monitoring.

Figure 1:
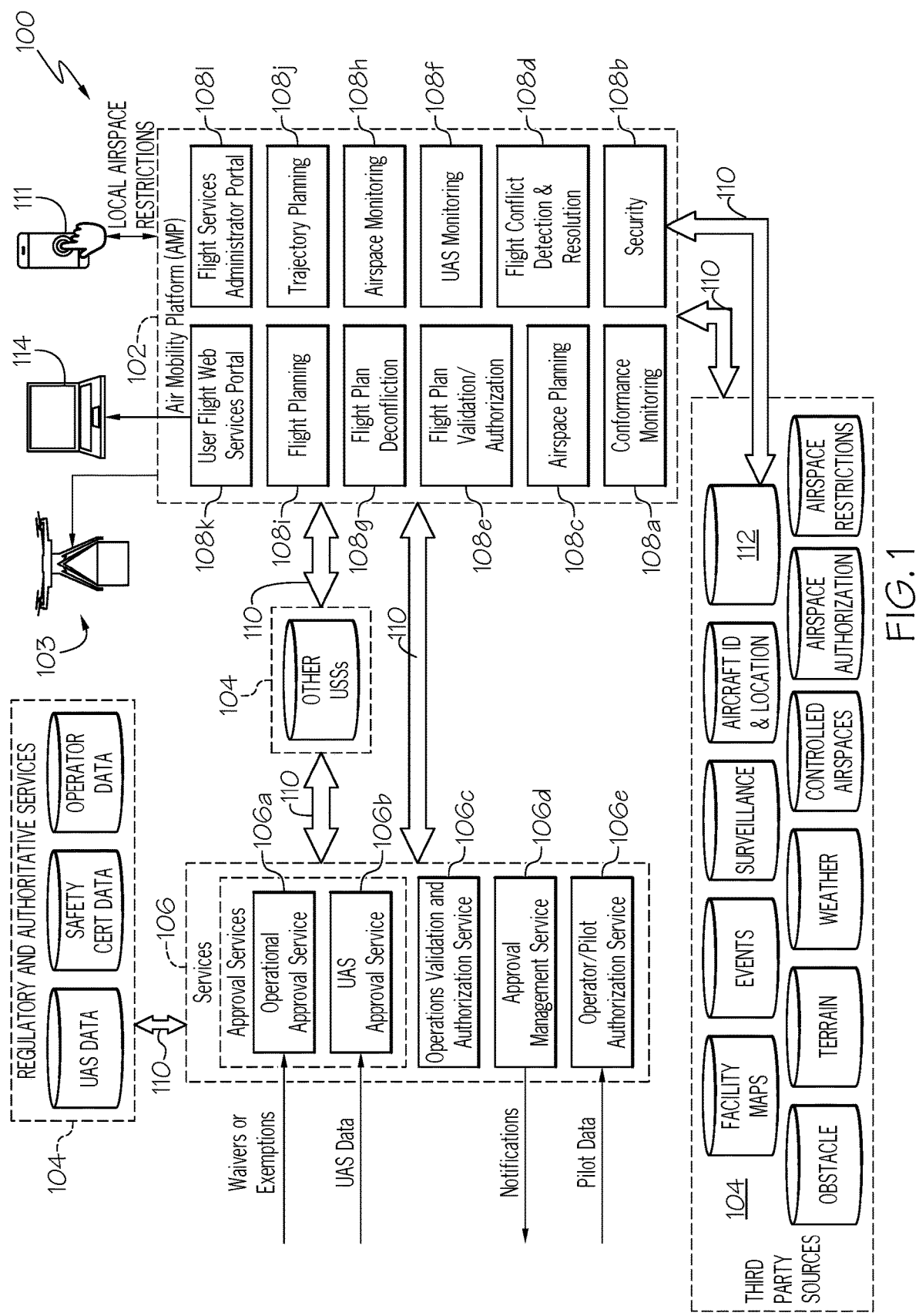
FIG. 1 depicts an architecture for providing trajectory planning for an aerial vehicle, according to embodiments provided herein.

Referring now to the drawings, FIG. 1 depicts an architecture 100 for providing trajectory planning services for a vehicle, according to embodiments provided herein. As illustrated, the architecture 100 provides an air mobility platform 102 that is communicative with third party data sources 104 to autonomously provide an operational approval service 106a, an aerial vehicle approval service 106b, an operations validation and authorization service 106c, an approval management service 106d, and an operator/pilot authorization service 106e (collectively "UA-centric services 106"). The air mobility platform 102 may be provided by one or more computing devices, such as those depicted in FIG. 14. The third party data sources 104 may be rules-based, non-rules based, informationally based, etc. As an example, some embodiments may provide multilayer services for an unmanned aerial vehicle 103, manned aerial vehicle, equipment, weather, ground control, and/or operational services.

The air mobility platform 102 may include one or more applications, such as a conformance monitoring application 108a, a security application 108b, an airspace planning application 108c, a conflict detection and resolution application 108d, a flight plan validation/authorization application 108e, an aerial vehicle monitoring application 108f, a flight plan deconfliction application 108g, an airspace monitoring application 108h, a flight planning application 108i, a trajectory planning application 108*j*, a user flight web services portal application 108*k*, and a flight services administrator portal application 108*l* (collectively referred to as "applications 108"). In embodiments, the applications 108 may each comprise logic that interact or communicate with one or more of a plurality of third party data sources 104, such as to obtain rules or as the result of externally applied rules, to obtain public or privately available information, and/or obtain data models or approval models provided by authoritative bodies and/or other third parties, such as the FAA or the National Weather Service or the U.S. Geological Survey.

In embodiments, the applications 108 may communicate with each other. Moreover, while identified as different applications 108 at least for purposes of explanation, it is noted that the applications 108 may be combined or subdivided in any appropriate manner. As illustrated, the applications may include a conformance monitoring application 108*a* which may monitor conformance of an aerial vehicle 103 with flight plans. In another aspect, the applications may include a security application 108*b* which may provide system security and diagnostics functions. For instance, security application 108*b* may ensure security during flight of an aerial vehicle 103. According to embodiments, the applications 108 may include an airspace planning application 108*c* which may provide rules and parameters for an airspace. Additionally or alternatively, the applications 108 may include a conflict detection and resolution application 108*d* that may determine conflicts proposed flight plans and non-native data, such as information from third party data sources 104 as described herein. It is further noted that conflict detection and resolution application 102*d* may be utilized, such as by flight planning application 108*i* to determine candidate trajectories.

A flight plan validation/authorization application 108*e* may determine whether a flight plan is feasible, validate flight plans via conflict detection and resolution application 108*d*, or other applications. A UAS monitoring application 102*f* may assist in monitoring at least one aerial vehicle 103 to determine requests, operating parameters, or the like. A flight plan deconfliction application 108*g* may identify and resolve conflicts (e.g., deconflict) between flight plans and proposed flight plans and generate resolutions by modifying trajectories. In some embodiments, flight planning application 108*i* may utilize flight plan deconfliction application 108*g* to identify candidate flight plans. It is further noted that flight plan validation/authorization application 108*e* may utilize deconfliction application 108*g* and/or conflict detection and resolution application 108*d* to verify, authorize, or reject flight plans. An airspace monitoring application 108*h* may monitor airspaces for changes, conflicts, or the like. In an aspect, the airspace monitoring application 108*h* may communicate with aerial vehicles 103, third party data sources 104, and other information to provide real-time or near real-time monitoring of an airspace. According to various embodiments, this monitoring may be utilized to authorize, reject, modify, or otherwise process flight plans that may be subject to a request or may have already been granted or denied.

As described here and elsewhere, the flight planning application 108*i* may communicate with various other applications and data sources, such as a trajectory planning application 108*j*, to identify an optimized trajectory or otherwise deny a flight plan. Is if further noted that the referenced applications 108 may communicate with a user, such as via a user flight web services portal application 108*k*, or a flight services administrator portal application 108*l*. As described herein, user interfaces may be provided specific to the user flight web services portal application 108*k*, the flight services administrator portal application 108*l*, or others.

The UA-centric services 106 may provide an operating system for native or external engines, modules, and applications, such as the applications 108. The applications 108 may each include modules or applications that draw on the third party data sources 104. The third party data sources 104 may include aerial vehicle data, safety certification data, operator data, other USS data, facility maps data, events, surveillance data, aerial vehicle identification and location data, obstacle data, terrain data, weather data, controlled airspaces data, airspace authorization data, airspace restrictions data, and/or other third party data sources 112.

The third party data sources 104 may include rules, the result of externally applied rules, public or privately available information, data models, approval models such as may be provided in relation to aerial vehicle registration, operator registrations, relevant identity certifications of aerial vehicle and/or operators, flight plan submissions, mission requests, capabilities verifications, testing data, simulation data, etc. As such, the third party data sources 104 may extend beyond typical aerial vehicle aspects, including but not limited to authoritative data provided by other rulemaking or governmental bodies, such as the FCC in relation to radiofrequency operation within FCC bandwidth guidelines, or the National Weather Service, etc.

The air mobility platform 102 may also provide interaction with the applications 108 over any of a plurality of communication sockets 110 that may apply security features and a user interface 114 (one or more). The air mobility platform 102 may provide the UA-centric services 106 and such as may include the planning, approval, and modification of airspace rules (such as exclusionary management for first responders/no fly zones as they arise, and the like), aerial vehicle or user profiles, submitted mission requests, conformance with flight plans, confliction of flight plans, conflict resolution, etc. This data may be communicated between the air mobility platform 102 over a multi-level bus 330, such as for display on the user interface 114.

The air mobility platform 102 may interact with the third party data sources 104, such as but not limited to authoritative, governmental, historical, simulation, and weather-related sources. For example, third party aerial vehicle and ground-based surveillance may be monitored and data obtained therefrom. Obstacle detection sites, such as terrain, geographical and structural assessment may be accessed. Weather forecasting may be accessed for any area relevant to the mission requested. Aerial vehicle use, capability, health, and performance data may be assessed. Current airspace activity by other aerial vehicle, no fly zones, and the like may also be monitored.

That is, the architecture 100 may enable and control the communication sockets 110 to the third party data sources 104, and may select therefrom relevant data unique to each request for the UA-centric services 106 for use by the decision-making aspects of architecture 100. Thereby, the UA-centric services 106 may be provided in real time, even in the event of submission of a large number of service requests in a variety of different geographies and air spaces substantially simultaneously, and/or where each service utilizes a distinct assessment and manipulation of data unique to each such geography, airspace, or operator.

Figure 2:
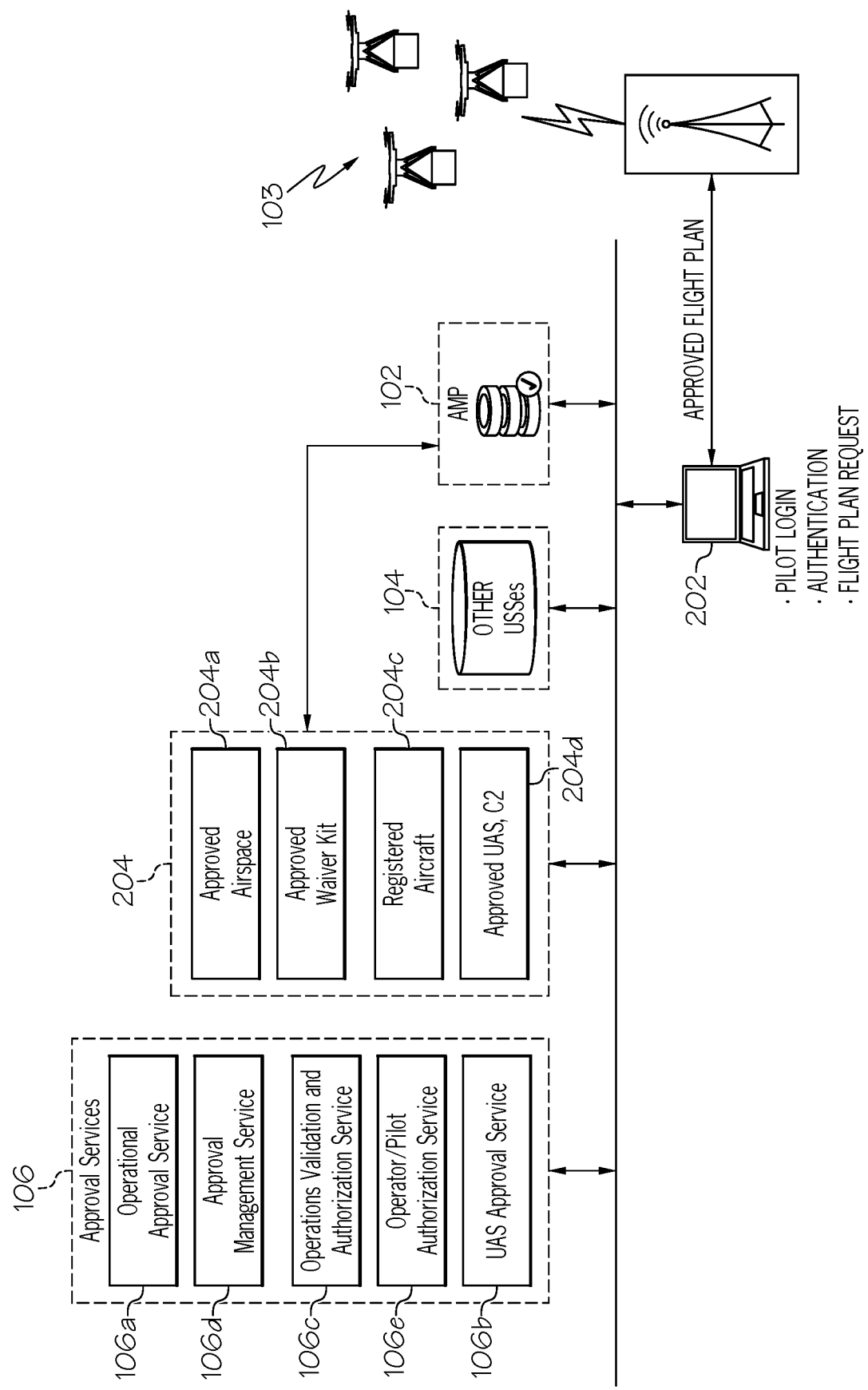
FIG. 2 depicts a computing environment for utilizing the air mobility platform of FIG. 1 to provide providing trajectory planning for an aerial vehicle, according to embodiments provided herein.

FIG. 2 depicts a computing environment for utilizing the air mobility platform 102 to provide trajectory planning services for an aerial vehicle 103 (which may be configured as an unmanned aerial vehicle), according to embodiments provided herein. As illustrated, a user of a user computing device 202 may access a user interface 114 (FIG. 1) provided by the air mobility platform 102 to make a service request for one or more of the UA-centric services 106 and/or service data 204 for the aerial vehicle 103. As illustrated, the UA-centric services 106 of this embodiment may an operational approval service 106a, an approval management service 106d, an operations validation and authorization service 106c, an operator/pilot authorization service 106e, and an aerial vehicle approval service 106b. The service data 204 in this embodiment may include approved airspace data 204a, an approved waiver kit 204b, registered aerial vehicle data 204c, and approved UAS data 204d. Similarly, third party data sources 104 (FIG. 1) may make a service request for a third party vehicle.

Depending on the particular embodiment, the service request may include approved airspace reservation, conflict identification, conflict resolution, etc. Upon receiving approval, the user computing device 202 (which may or may not be the same computing device that requested the service) may control the aerial vehicle 103 according to the UA-centric services 106 that was requested.

Figure 3:
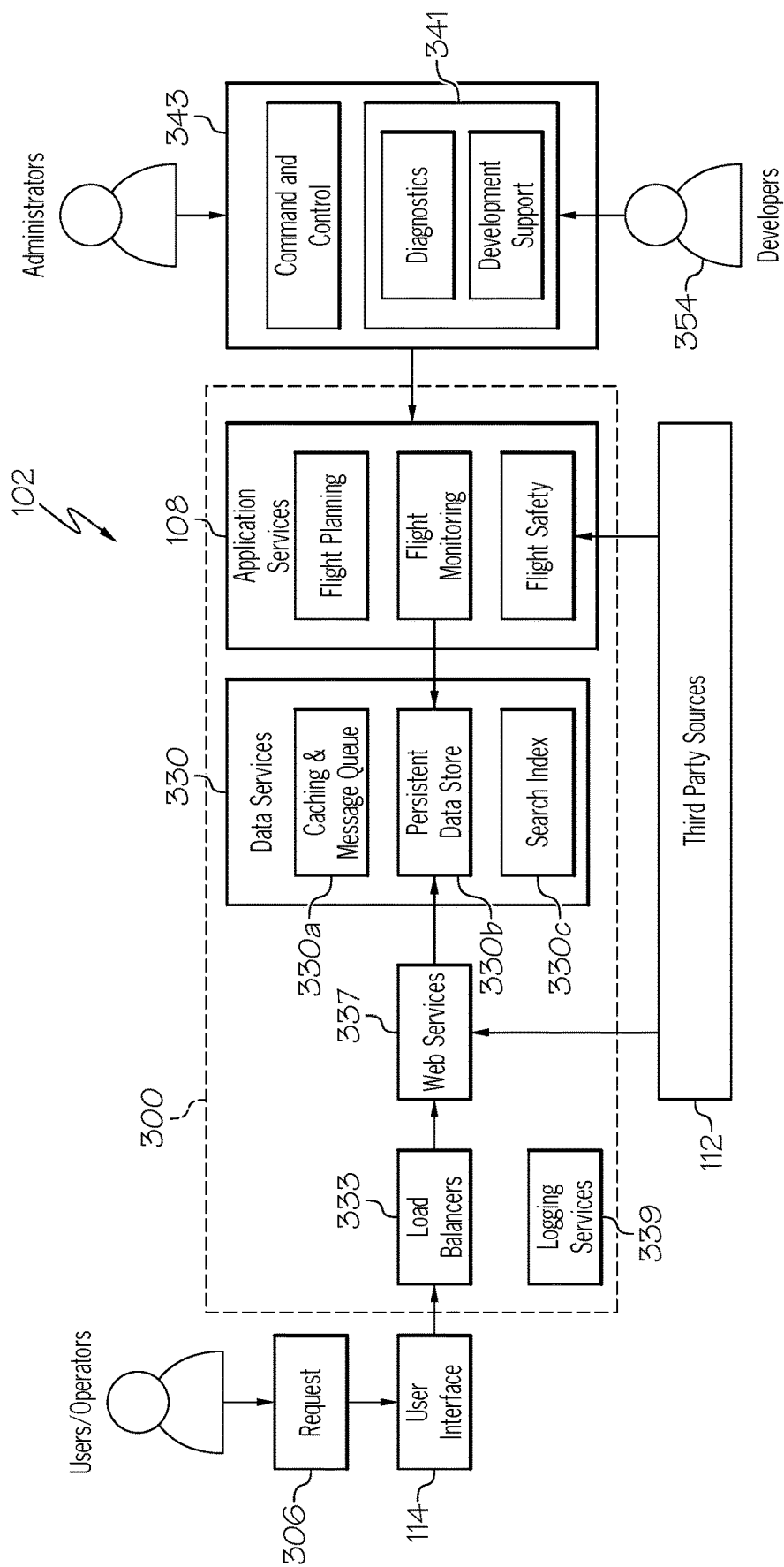
FIG. 3 depicts a services architecture f providing trajectory planning for an aerial vehicle, according to embodiments provided herein.

FIG. 3 depicts a services architecture 300 for providing surveillance services for an aerial vehicle 103, according to embodiments provided herein. As illustrated, the services architecture 300 may be part of the air mobility platform 102 (FIG. 1) and may provide access to applications 108 that provide a service for the request 306. As described with reference to FIG. 1, the applications 108 may include a flight planning application 108i, a flight monitoring application, a flight safety application, and/or other applications. The services architecture 300 may provide administrative and/or user access to presentations of the applications 108, through the user interface 114.

As is further illustrated in FIG. 3, the services architecture 300 may provide operating-system level control over a variety of aspects in execution of the multi-level bus 330. The multi-level bus 330 may include a caching and message bus 330a, a persistent data bus 330b, and a search bus 330c. Additionally, the services architecture 300 may use the applications 108 to perform a service for the request 306 (which may be requested or automatically provided as part of a request). The services architecture 300 may further include load balancers 333, a web services module 337, a logging services module 339, etc.

The caching and message bus 330a may comprise logic for in-memory object caching or data grid. In the data grid, data may evenly be distributed among nodes of a cluster to provide horizontal scaling, which may provide for increased load capabilities and increase processing speed. For example, the logic of caching and message bus 330a may provide for distributed object caching and locking, and node-to-node messaging in a HAZELCAST architecture.

The persistent data bus 330b may store characteristic of states of processes or files. In an example, the persistent data bus 330b may persist (e.g., archive or store the state of data from) one or more databases. For instance, the persistent data bus 330b may persist data from third party data sources 104, including but not limited to data bases comprising information related to facility maps, events, surveillance, aerial vehicle ID and location data, obstacles, terrain, weather, controlled airspaces, airspace authorizations, mobile messages, and airspace restrictions. In examples, the services architecture 300 may comprise multiple instances of the persistent data bus 330b to provide security, load management, or the like. It is noted that the persistent data bus 330b may include logic that may transfer data to and from data stores and may provide mappings from the native programming-language data structures to data store storage structures.

The search bus 330c may comprise search and analytics logic. In examples, the search and analytics logic may comprise APIs, query DSLs, and clients that support a variety of programming languages, such that the search bus 330c may perform searches over different third-party data stores or systems. For instance, services architecture 300 may provide dynamic user interfaces to users based on a user's credentials, classification, or particular needs. The search bus 330c may search for data from one or more data sources such that user interfaces 114 may receive and display different pieces of data from different data stores. In an aspect, the search bus 330c may process request 306 and perform a query on one or more third party data sources 104 via third party services 323 (which may include a logic that provides access to third party data sources 104). It is noted that the search bus 330c may utilize a hash map, ELASTICSEARCH, SQLite, or the like.

According to embodiments, the multi-level bus 330 may direct applications to communicate with each other, such as with others on the same bus level, wherein those communications are arbitrated without the need of a host computer. For instance, the multi-level bus 330 may provide oversight and bus level assignments, on behalf of the services architecture 300. In an example, the multi-level bus 330 may control access to one or more of the levels and may coordinate the activities of all applications and requests by taking into account the needs of various applications and requests. In at least one embodiment, the multi-level bus 330 may control priority for gaining access to resources according to a predetermined priority. For instance, a priority system may provide priority to first responders for certain applications, may provide priority to requests 306 associated with specific users, may provide priority to requests 306 for particular mission critical or safety applications, and the like. Further, the services architecture 300 may include control, monitoring, security and switching capability for a variety of communication inputs, outputs, and links provided by and communicative with the aspects throughout the master services system.

As described herein, the air mobility platform 102 may receive requests 306 from one or more users 352. Load balancers 333 may include logic to manage network loads and may prioritize certain requests related to safety, first responders, or the like. Web services 377 may listen for requests 306 over a network, such as via one or more communication sockets 110 of FIG. 1. It is noted that web services 377 may communicate with mobile applications, servers, or the like. In another aspect, web services 377 may interact with or compile content from third party services 323 in to a single user interface 114. The multi-level bus 330 may process requests 306 and may provide access to one or more applications via the application services 302 based on received request 306 and priority. For instance, the application services 302 may select an appropriate application for performance of the services related to the request 306. The selected application of the application services 302 may perform such services and may provide responses to a UAS, the user interface 314, or other appropriate systems. In at least some embodiments, the communication sockets 110 may include logging services module 339 to log network traffic, user requests, system performance or activity, and the like.

In another aspect, the services architecture 300 may provide inputs and outputs for a variety of data and information, such as to and from a user 350, 352, or 354, as well as to and from the third-party sources 323 or services. As such, users may utilize a user device that receives and provides user interface 114 to interact with third party sources 323 via the master services architecture 300.

For instance, the multi-level bus 330 may provide for communications between the user interface 114 and the application services 302. The multi-level bus 330 may, for example, include logic to select the appropriate application services 302 to grant the request 306 for a service, over the multi-level bus 330. It is noted that application services 302 may include applications providing services via the multi-level bus 330 that are not directly related to the request 306. The services architecture 300 may additionally vary in its presentation and deployment to different users, developers, third-parties, and administrative entities In an aspect, the services architecture 300 may include administrative services 343 that may allow an administrative level user 350 or developer level user 354 to perform various functions, such as performing diagnostics, developing applications 108, or commanding and controlling aspects of the services architecture 300.

The services architecture 300 may further provide inputs and outputs for a variety of data and information, such as to and from a user, as well as to and from the third party data sources 104, which may interact with one another and with the applications 108 that include the logic to select which of services for the request 306 are granted, over the multi-level bus 330.

The actions performed may include services provided via the multi-level bus 330 that may or may not be directly related to the request 306. As an example, the provided services may include load balancing via a load balancers 333, web and communication link management via the web services module 337, data logging services via a logging services module 339, development support and diagnostics via a support module 341, and administrative services via a command and administrative services 343.

In an aspect, the services architecture 300 may provide tunnel access to some or all applications 108 (e.g., though application services 302) and third-party sources 323 to user interface 114 or services. The services architecture 300 may provide tiered user access (e.g., administrative level user 350, non-administrate or basic user 352, developer level user 354, pilot, first responder or emergency user, or other credential based access) to receive user interface 114 presentations of one or more of the applications 108. The services architecture 300 may additionally vary in its presentation and deployment to different users, developers, third parties, and administrative entities.

Figure 4:
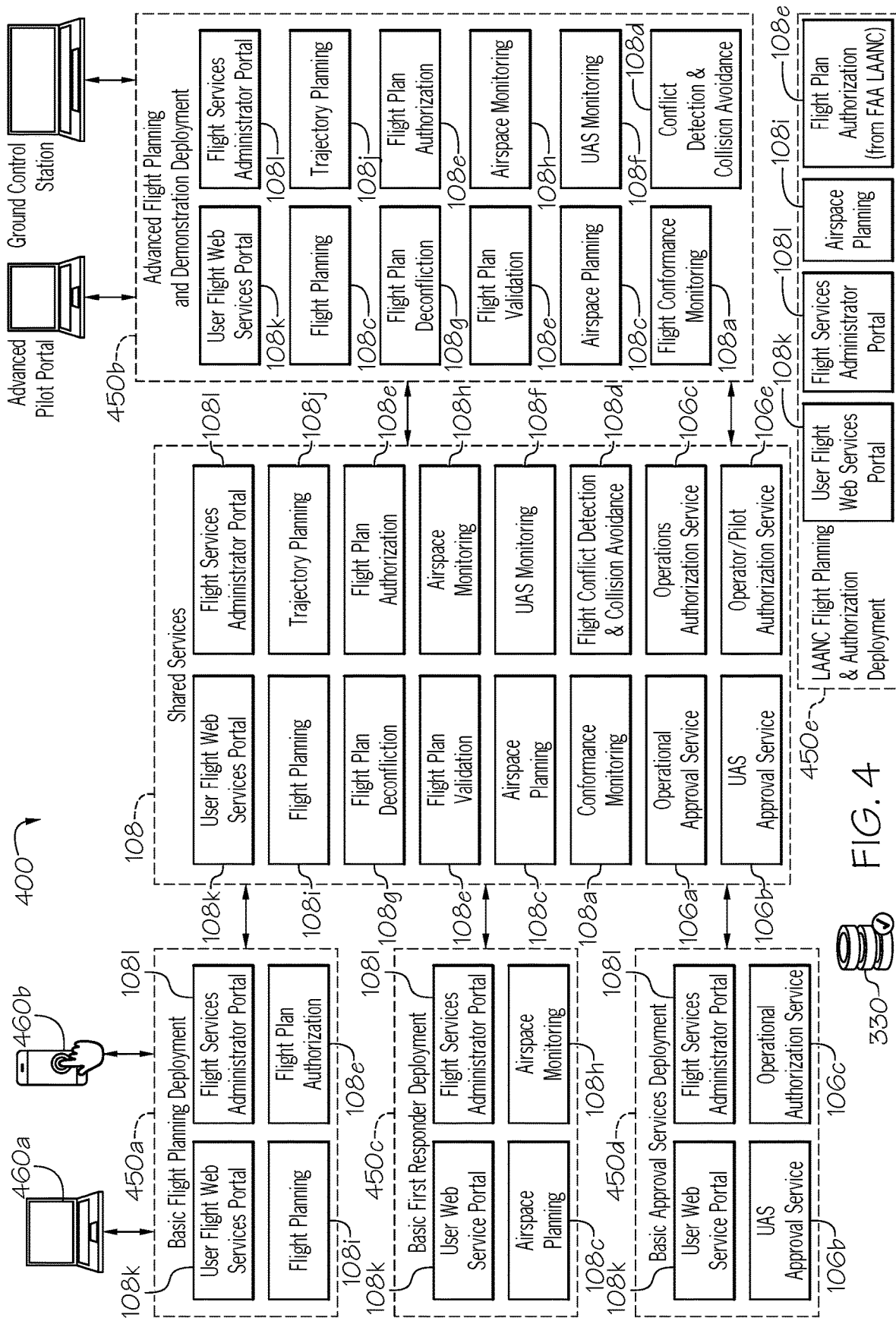
FIG. 4 depicts another services architecture for providing trajectory planning services showing shared application for one or more different types of applications, according to embodiments provided herein.

FIG. 4 depicts another services architecture 400 for providing surveillance services showing shared application for one or more different types of applications, according to embodiments provided herein. As illustrated, users may receive a deployment of the services architecture 400 to access data and/or the applications 108, such as may relate to a basic functionality level of the multi-level bus 330. In some examples, users may be provide with tunnel access to various applications 108. In addition to the applications 108*a*-108*l* provided in FIG. 1, the applications 108 may additionally include the operational approval service 106*a*, the validation and authorization service 106*c*, the aerial vehicle approval service 106*b*, operator/pilot authorization service 106*e* and/or other UA-centric services 106. The applications 108 and/or UA-centric services 106 that are shared may vary, such as based on a request from a pilot portal computing device 460*a* and/or based on the permissions available for that user's login profile. This data and/or the applications 108 that are provided to this user may also be dependent upon the offerings provided by a basic flight planning deployment infrastructure 450*a* with which the pilot portal computing device 460*a*, the pilot application 460*b*, and/or other pilot controlled devices communicate. In at least one embodiment, applications 108 may interact with third-party or non-native applications 402. This variability in the deployment of the services architecture 400 may be sensed and controlled by the services architecture 400 itself, such as using sensed values by the applications 108 over the multi-level bus 330.

As illustrated in FIG. 4, particular types of users and/or requests may receive access and/or data to and through one or more of the applications 108, such as captive/native applications of the services architecture 400. As an example, a basic flight planning deployment infrastructure 450*a* may share the user flight web services portal application 108*k*, the flight services administrator portal application 108*l*, the flight planning application 108*i*, and the flight plan validation/authorization application 108*e*. Similarly, an advanced flight planning and demonstration deployment infrastructure 450*b* may share the user flight web services portal application 108*k*, the flight services administrator portal application 108*l*, the flight planning application 108*i*, the trajectory planning application 108*j*, the flight plan deconfliction application 108*g*, the flight plan validation/authorization application 108*e*, the airspace monitoring application 108*h*, the airspace planning application 108*c*, the aerial vehicle monitoring application 108*f*, the conformance monitoring application 108*a*, and the conflict detection and resolution application 108*d*.

A basic first responder deployment infrastructure 450*c* may share the user flight web services portal application 108*k*, the flight services administrator portal application 108*l*, the airspace planning application 108*c*, and the airspace monitoring application 108*h*. A basic approval services deployment infrastructure 450*d* may share the user flight web services portal application 108*k*, the flight services administrator portal application 108*l*, the aerial vehicle approval service 106*b*, and the operations authorization service 106*c*.

Similarly, a low altitude authorization and notification capability (LAANC) flight planning and authorization deployment infrastructure 450*e* may share the user flight web services portal application 108*k*, the flight services administrator portal application 108*l*, the flight planning application 108*i*, and the flight plan validation/authorization application 108*e* from (FAA LAANC).

It will be understood that the foregoing deployment of the services architecture 400 may utilized a shared set of non-user facing services/applications. For example, such a shared set of services may include load balancing, communication link provisioning, data storage, generation of alerts, input and output control, security, etc. These shared services may be deployed as one or more interface sockets communicatively associated with each of the unique deployments of the services architecture 400 discussed herein.

Accordingly, the embodiments may enable a mission request approval process for an aerial vehicle 103 that is unique to each request, and that is relationally applied, such as from one or more databases of the air mobility platform 102. Further, the air mobility platform 102 may analyze network loads and requests based on weighing and balancing of factors, wherein the weighting and balancing may vary in accordance with machine learning over time. For example, factors may be applied based on priority, wherein certain factors are weighted more heavily than other factors in a given approval request. By way of example, static factors, which may be more simply approved by the disclosed embodiments, may be prioritized in order to expedite processing and improve allocation of computing resources. Thereafter, dynamic factors may be assessed by the disclosed embodiments, but such dynamic factors may be assessed only to the extent necessary, such as may be based on machine learning.

Figure 5:
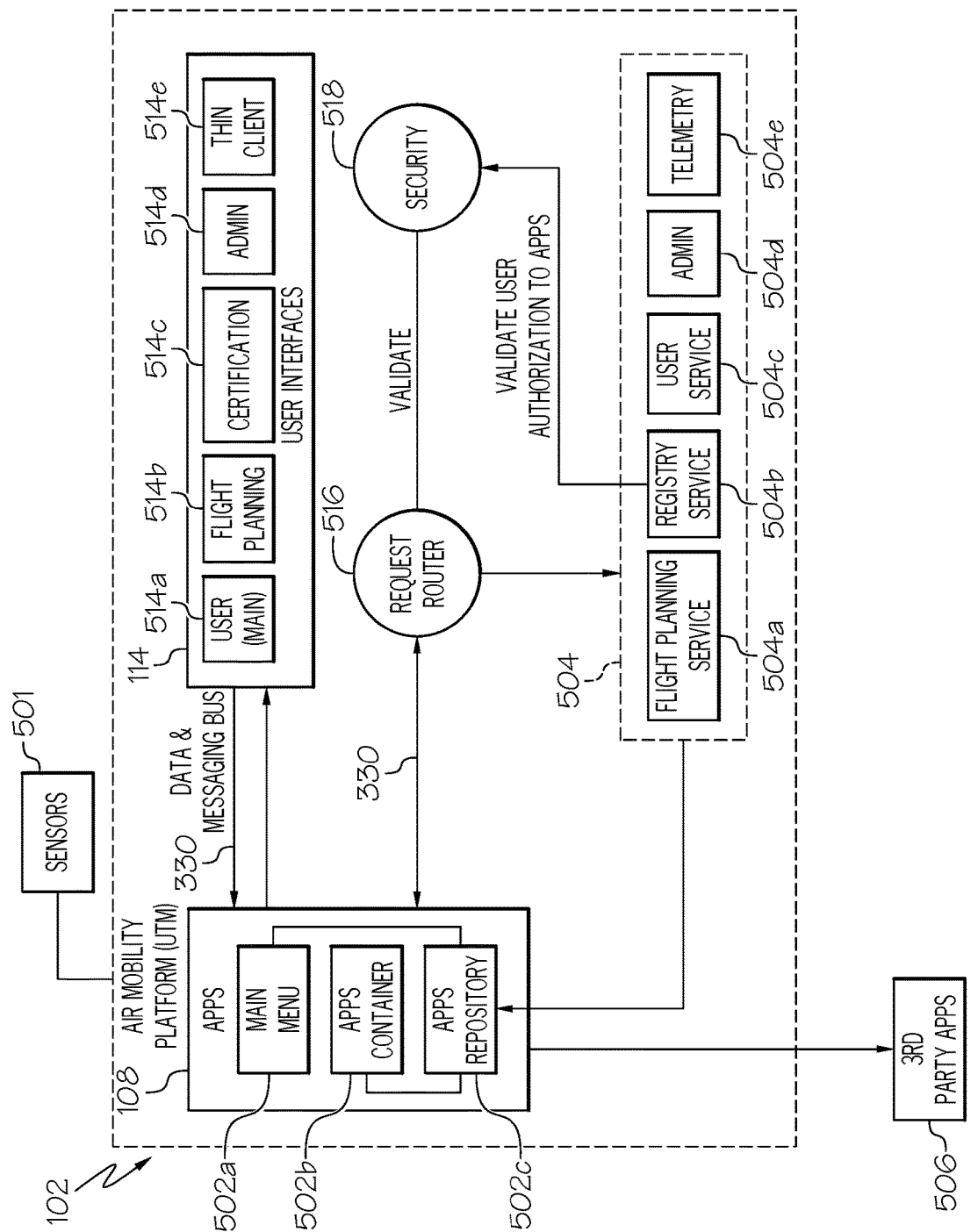
FIG. 5 depicts a depiction of user interfaces provided by the air mobility platform, according to embodiments provided herein.

FIG. 5 depicts a depiction of user interfaces 114 provided by the air mobility platform 102, according to embodiments provided herein. As illustrated, the air mobility platform 102 may provide intermediate processing between certain data inputs, such as: at least one surveillance sensor, such as surveillance sensors 501; applications 108, which may be provided with a user main menu interface 514a, an flight planning interface 514b, and a certification interface 514c. The air mobility platform 102 may provide one or more of the user interfaces 114, such as the certification interface 514c. The air mobility platform 102 may include a flight planning service application 504a, a registry service application 504b, a user service application 504c, an administrator application 504d, and a telemetry application 504e.

The applications 108 may access third party applications 506. The applications 108 may also access the registry service application 504b via a request router 516a and a security module 518 that may secure data exchanges and validate user authorizations to access data or applications 108. The applications 108 may provide presentation of one or more user interfaces 514, such as a user main menu interface 514a, a flight planning interface 514b, a certification interface 514c, an administrator interface 514d, and a thin client interface 514e.

The user main menu interface 514a may provide access to the one or more of the applications 108 and/or third party applications 506. The air mobility platform 102 may further provide the user interfaces 114 over the multi-level bus 330, which may include levels such as caching and message bus 330a, wherefrom one or more data requests and request results may occur; and/or a persistent data bus 330b, and/or a search bus 330c.

In accordance with various embodiments, a user via a user computing device (e.g., user computing device 102a) may utilize one or more user interfaces 114 to form a mission specification and mission request for a particular flight. The air mobility platform 102 may include or identify takeoff and landing sites, particular specifications of an aerial vehicle 103, mission objectives, available trajectories, maneuver sequences/libraries, geographical waypoints, autopilot data needs, communication methodologies available for a particular aerial vehicle 103, and the like.

In an aspect, user interfaces 114 may include or otherwise have access to applications 108. As such, an user interface 114 may include a main menu 502a that may receive input from a user to perform desired functions, such as forming a mission specification. The air mobility platform 102 may provide an application container 502b (which may include software code and dependencies so the applications 108 be accessed on various computing environments), and an application repository 502c (which may store application containers 502b). In examples, applications 108 may be provided to user computing devices by providing application containers 502b to a user computing device over the multi-level bus 330. In some other examples, a user interface 114 may be given tunnel access to an application 108 running on a remote computing device. For instance, air mobility platform 102 may analyze the mission specification and may approve, modify, reject (e.g., fail), or otherwise process the mission specification via a remote computing device. The air mobility platform 102 may generate suggested solution trajectories for completion of a mission identified by the mission specification. Modifications may be presented for user, via the user interface 114, for approval or acceptance.

Figure 6:
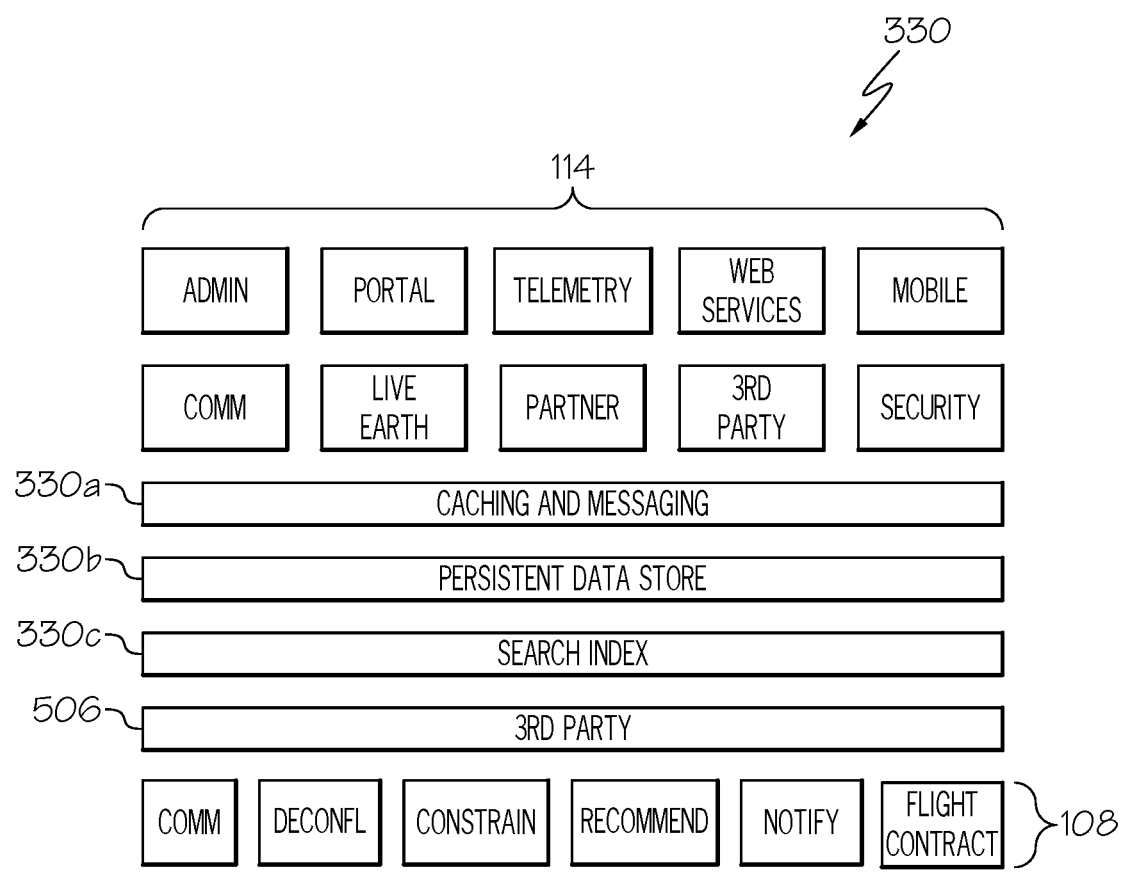
FIG. 6 depicts a multi-level bus for providing trajectory planning for an aerial vehicle according to embodiments provided herein.

FIG. 6 depicts a multi-level bus 330 for providing trajectory planning services for an aerial vehicle 103 according to embodiments provided herein. As illustrated, the multi-level bus 330 may be configured as a layered bus for handling different service levels of information, data and data requests, and/or for handling application communications of different applications operating at different layers. As illustrated, co-resident information and messaging may be exchanged over an in-memory grid bus level, such as the caching and message bus 330a, while external information may be exchanged over a database bus level, such as persistent data bus 330b to one or more captive, co-resident databases and/or to one or more system external third-party databases. A search data bus level, such as search bus 330c may provide for user search inquiries and/or may provide query response to internal queries from the applications 108 (FIG. 1) and/or the native applications 504 (FIG. 5) stemming from the providing of surveillance services. Also provided are the applications 108, as well as the third party applications 506, and the user interfaces 114. It should be understood that while FIG. 6 depicts three levels of the multi-level bus 330, this is merely an example, as some embodiments may have more or fewer levels.

The user interfaces 114 depicted in FIG. 6 include an administrative portal interface, which may hold administrative code for providing the user interface 114, which may include one or more APIs; a web services interface, a trajectory planning interface, etc. Similarly, the applications 108 may include a deconfliction application, which may insure proposed flight plans and trajectories do not conflict with terrain, other airspaces, other aerial vehicle, other flight plans, assets, structures, etc. The applications 108 may include a messaging application, which may serve environments of the air mobility platform 102 to exchange messages. The applications 108 may include a conformance monitoring application 108a, which may check for telemetry conformance with a flight plan contract and alert other systems and operators in the event of nonconformance. In some embodiments, the applications 108 may include a suggestion application, which may suggest alternative flight plans for those rejected by deconfliction. The applications 108 may include a USS gateway application, which may serve as a search and discovery gateway; a push messaging application, which may send push notifications to particular applications 108; a constraint management application, which may manage implications of modifications to current flight rules and restrictions, and/or other applications.

In some embodiments, the applications 108 may include a controlled airspace application, which may serve environments of the air mobility platform 102 to communicate regarding controlled airspaces. The applications 108 may include a partner services application, which may ingest third party data, such as regarding weather, airspace, flight restrictions, flight rules, etc. from trusted third party source. Similarly, the applications 108 may include one or more other applications used in the air mobility platform 102 and as may be apparent to the skilled artisan in light of the disclosure herein.

In accordance with the foregoing, and particularly with respect to the multi-level bus 330 of FIG. 6, a user may engage in data exchanges, messaging, processes, and analyses to form a mission specification and mission request for a particular aerial vehicle 103 for a particular flight. As such, the air mobility platform 102 may enable a performance model, which may include takeoff and landing sites, particular specifications of the aerial vehicle 103, as well as mission objectives. Also represented may be available trajectories, such as maneuver sequences/options, maneuvering capabilities, geographical waypoints, autopilot data needs, communication methodologies available for a particular aerial vehicle 103, etc.

The user may input to the user interface 114 a mission specification, which may be analyzed, and which may be approved, such as including suggested solution trajectories for the requested mission, or which may be failed, by the air mobility platform 102. If an approved trajectory plan is issued, the user may accept the plan or modify the plan through the user interface 114 and the solution trajectory (and/or flight plan) may be uploaded to traffic management aspects, such as unmanned air traffic management systems, ground control systems, etc., such as using the user interfaces 114. The solution trajectory may be uploaded to the aerial vehicle 103, over a network accessible via one of the levels of the multi-level bus 330, and the aerial vehicle 103 may then perform flight in accordance with the uploaded flight plan.

Figure 7:
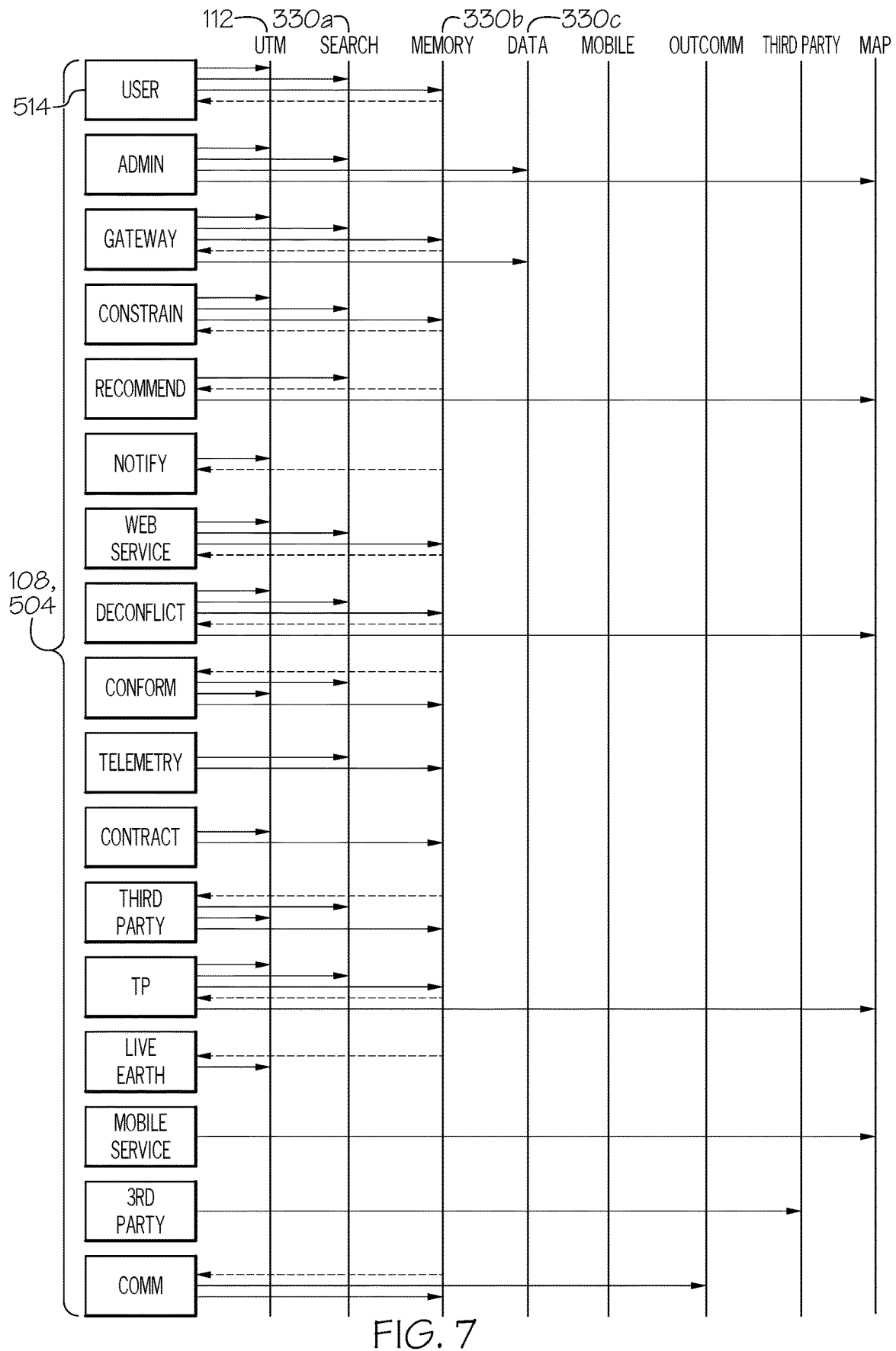
FIG. 7 depicts another example of a multi-level bus for providing trajectory planning for an aerial vehicle, according to embodiments provided herein.

FIG. 7 depicts another example of a multi-level bus 330 for trajectory planning services for an aerial vehicle 103, according to embodiments provided herein. As illustrated, the multi-level bus 330 may be configured to provide one or more of the user interfaces 114 (FIGS. 1, 5, 6) to users, where the user interfaces 114 may provide information exchanged over the bus levels heretofore unavailable autonomously regard to the aerial vehicle 103. The applications 108 and native applications 504 may be configured for providing other aspects of a request, both related directly to the request and as background aspects of the request. These services may be provided, both natively and non-natively, by the multi-level bus 330.

As illustrated in the example of FIG. 7, the user application may communicate data with one or more of the third party data sources 104, such as an aerial vehicle traffic management (UTM), the caching and message bus 330a, and receive data from the persistent data bus 330b. The admin application may send data to the third party data sources 104, the caching and message bus 330a, search bus 330c, and a map node. The gateway application may send data to the third party data sources 104, the caching and message bus 330a, and the persistent data bus 330b. The gateway application may receive data back form the persistent data bus 330b and send data to the search bus 330c. The constrain application may send data to the third party data sources 104, the search bus 330c, and the persistent data bus 330b and receive data back form the persistent data bus 330b. The recommend application may send data to the search bus 330c, receive data from the persistent data bus 330b, and send data to the map node. The notify application may send data to the third party data sources 104 and receive data from the persistent data bus 330b.

The web service application may send data to the third party data sources 104, the search bus 330c, and the persistent data bus 330b and receive data back form the persistent data bus 330b. The deconflict application may send data to the third party data sources 104, the search bus 330c, and the persistent data bus 330b. The deconfliction application 108g (FIG. 1) may receive data back from the persistent data bus 330b and send data to the map node.

The conform application may receive data from the persistent data bus 330b, send data to the search bus 330c, send data to the third party data sources 104, and send data to the persistent data bus 330b. The telemetry application 502e may send data to the search bus 330c and the persistent data bus 330b. The contract application may send data the search bus 330c and the persistent data bus 330b. The third party application may receive data from the persistent data bus 330b and send data to search bus 330c, the third party data sources 104, and the persistent data bus 330b. The TP application may send data to the third party data sources 104, the search bus 330c, and the persistent data bus 330b. The TP application may also receive data from the persistent data bus 330b and send data to the map node.

The live earth application may receive data from the persistent data bus 330b and send data to the third party data sources 104. The mobile service application may send data to a mobile node. The third party application may send data to the third party node. The communication application may receive data from the persistent data bus 330b, send data to the outward communication node, and send data to the persistent data bus 330b.

Figure 8:
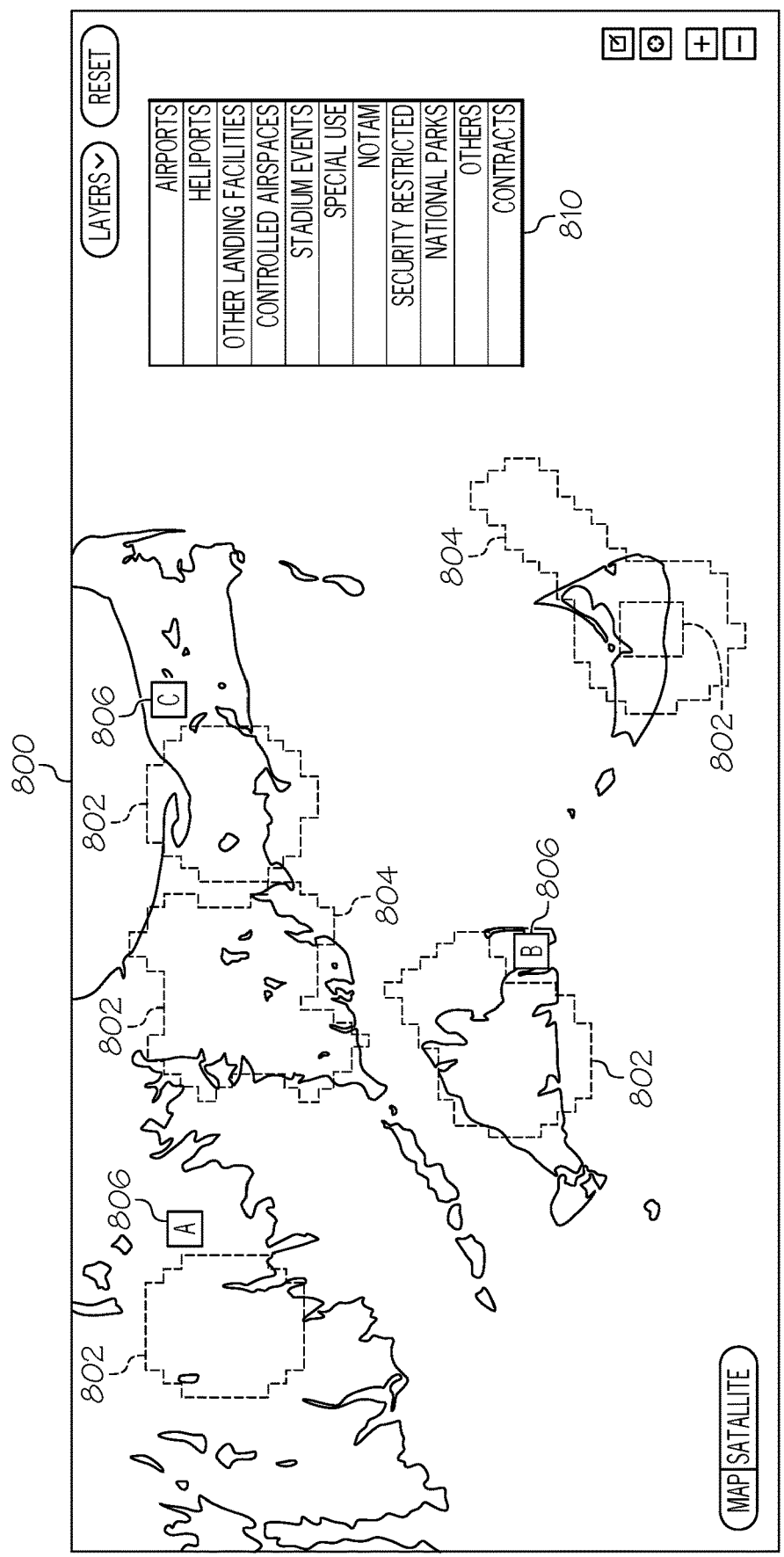
FIG. 8 depicts a user interface on a remote computing device for providing trajectory planning, according to embodiments provided herein.

FIG. 8 depicts a user interface 800 that may be provided for trajectory planning services for an aerial vehicle 103, according to embodiments provided herein. The user interface 800 may be rendered via a user computing device by way of instructions from the air mobility platform 102. The user interface 800 may provide a variety of information 802 related to aeronautical information (e.g., information related to controlled airspace which may include airspace restrictions), overlaid on a map or lattice grid 804 that includes tokens marking available waypoints 806 for a user's requested mission which may be identified by a summation of waypoints 806. It is noted that the user interface 814 may provide other available information to the user via a drop-down menu 810, which may include information from third-party sources or databases which may affect a submitted mission request. Such information may include airports, heliports, other landing facilities, controlled air spaces, stadium events, special use cases, notice to airmen ("NO-TAM") information regarding potential hazards along a flight route, security restricted information, national parks or other nature reserves, general other information, and contracts which may prohibit or otherwise direct airspace use. It is noted that a user may select or deselect one or more items from drop-down menu 810 for display on the user interface 800. The display of selected information may be layered to provide an aggregate summary or view of any selected information.

Selection of information to be presented may instruct the user interface 800 to retrieve or otherwise request information. Such a request may be sent to the air mobility platform 102. The air mobility platform 102 may utilize the multi-level bus 330 to access one or more third-party data sources. It is noted that requests may be processed as information is selected from the drop-down menu 810, may be automatically updated or pushed to the user interface 114, or otherwise processed.

It is further noted that in some embodiments, a user may not need to request third-party information for mission request, but rather the air mobility platform 102 may assess a need for third-party information for a given mission specification entered to user interface 800, and may accordingly actuate a level of multi-level bus to obtain such third party information from sources outside of a master services architecture. This may allow for secure retrieval of reliable information from known sources.

FIG. 8 also provides additional information available to the user and further indicates processing performed by the air mobility platform 102 on information exchanged over the multi-level bus 330 (FIGS. 3, 5, 6, 7) to provide a user interface 114 to the user. In the example of FIG. 8, the air mobility platform 102 has an added color or shading coding to denote a variety of information to assist the user in developing a mission request, and additionally includes notes to the user as to how best to satisfy current rules and restrictions in order to enable construction of an acceptable mission request.

Accordingly, these embodiments may enable applications-based services for an aerial vehicle 103 that is unique to a service request, and that is relationally applied, such as from one or more databases of the air mobility platform 102 within or communicatively associated with the services architecture or via data or information available from the one or more sockets to a captive rule-set of the air mobility platform 102, and/or from the one or more third party websites. The relationally applied information may include rules, data, static information, dynamic information, etc.

Further, the providing of services may include a weighting and balancing of the various relationally applied factors, where the weighting and balancing may vary in accordance with machine learning over time. For example, factors may be applied based on priority, wherein certain factors are weighted more heavily than other factors in a given services request.

Moreover, in accordance with embodiments, a plurality of databases may be utilized to determine a trajectory prediction or plan that is heretofore unknown. That is, the embodiments may relationally employ many different sources of information, all of which may be utilized to determine modifications to trajectories by the disclosed master services architecture. It is noted that such trajectory determination may be unique to each mission request, may be modified based on machine learning over time, and may be performed to optimize dedication of computing resources. It is noted that aerial vehicle may provide a variety of flight missions. Such missions may include, as discussed throughout, package delivery, site inspection, security, airspace violation monitoring, and the like. Such missions may be formulated as "waypoint" or "checkpoint" missions, coverage-planned missions, or terrain-following missions, by way of example FIG. 8 depicts a user interface 800 that may be provided for surveillance services for an aerial vehicle 103, according to embodiments provided herein. As illustrated, the user interface 800 may provide information 802 related to both permanent and temporary restricted airspace, overlaid on a map or lattice grid 804 that includes available waypoints 806 for the user's requested flight plan (the summation of waypoints 806). Also provided is additional information available to the user, such as from a drop-down menu 810, which may include information from third party sources or databases which may affect a submitted mission request.

It will be appreciated that the user may not need to request third party information for mission request, but rather the air mobility platform 102 may assess a need for third party information for a given flight plan request that is entered to the user interface 114, 800. These embodiments may accordingly actuate one of the levels of multi-level bus 330 (FIGS. 3, 5, 6, 7) to obtain such third party information from the third party data sources 104. Although such information availability to the user is illustrated as a drop-down menu in FIG. 8, it will be appreciated that other drill down capabilities to obtain native data and/or third party data may be available to the user.

Figure 9:
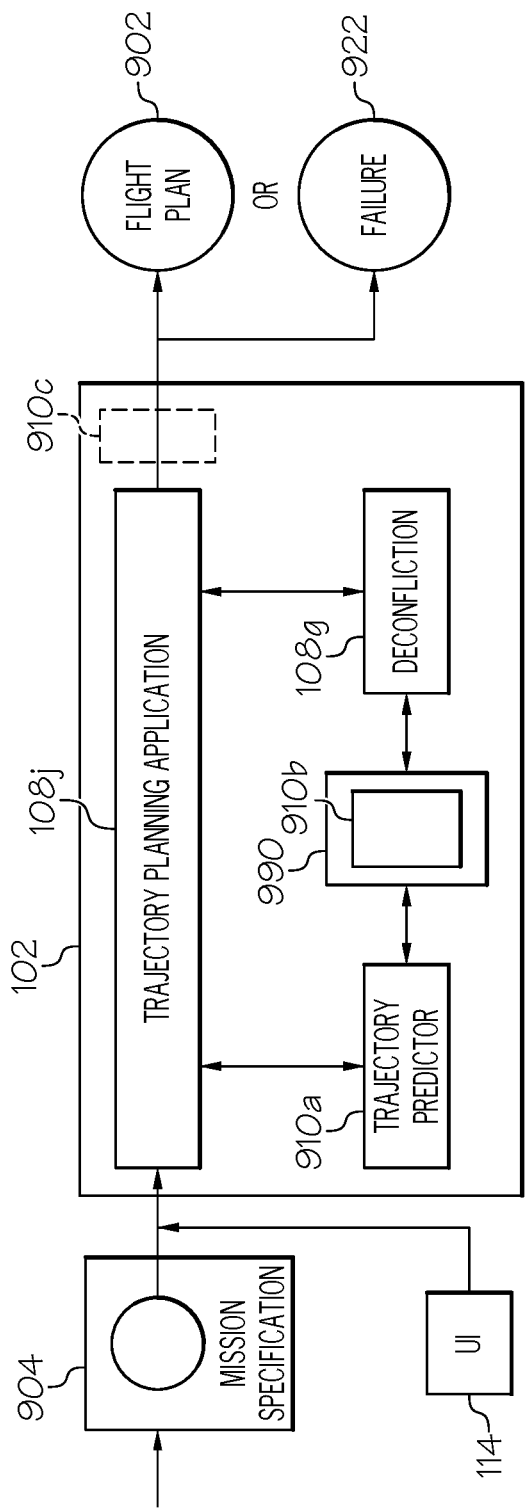
FIG. 9 depicts a trajectory planning system for providing a mission application approval service, according to embodiments provided herein.

FIG. 9 depicts a trajectory planning system for providing a mission application approval service, according to embodiments provided herein. As illustrated, a user or user computing device may enter a mission specification 904 via a user interface 114. The mission specification 904 may include information from one or more sources, such as a user, from sensors, UAS's, or the like. In at least one embodiment, the trajectory planning application 108*j* may be implemented within or as part of the air mobility platform 102. The trajectory planning application 108*j* may be computer implemented on one or more servers, control stations, or the like. The trajectory planning application 108*j* may be configured to cause the air mobility platform 102 to plan a mission for one or more aerial vehicles 103. The trajectory planning application 108*j* may receive a mission specification as input, where the mission specification may identify one or more of a request trajectory, at least one target waypoint, ordered sequence of waypoints, time of arrival at a given waypoint (e.g., desired window of arrival, latest arrival time, etc.), vehicle orientation at a given waypoint (e.g., direction, altitude, trajectory at or over a waypoint, etc.), speed at a given waypoint, length of time at a given waypoint, takeoff/landing requirements at a given waypoint, required metrics for the mission (e.g., speed, time, fuel use, cost, etc.), or the like. The trajectory planning application 108*j* may cause the air mobility platform 102 to provide a mission specification receiving service capable of receiving a request for the mission specification. In some embodiments, the trajectory planning application 108*j* may cause the air mobility platform 102 to provide one or more user interfaces to a user device (e.g., ground control station), or the like. The trajectory planning application 108*j* may receive cause the air mobility platform 102 to the mission specification receiving service. In some embodiments, the trajectory planning application 108*j* may cause the air mobility platform 102 to communicate with the trajectory predictor application 910*a*, which may be operative to access available motions from a motions library specific to the aerial vehicle 103 for which the mission is requested.

In another aspect, the air mobility platform 102 may include a flight restriction planner application 990. The flight restriction planner application 990 may cause the air mobility platform 102 to identify one or more optimization criterion 910*b* and aerial vehicle 103 specific flight restrictions. In some embodiments, the flight restriction planner application 990 may be communicative with the trajectory planning application 108*j* and may be communicative with third-party data sources or native data sources, such that the flight restriction planner application 990 may identify a plurality of non-native and native restriction conditions related to the request. Native restrictions may include, for example, geographic mapping restrictions that may be identified through a geographic mapping application presented via a user interface. The non-native restriction conditions may include restricted airspace, weather patterns, or other information not specific to or specified by the mission plan for the aerial vehicle 103. The non-native restriction conditions may be provided via at least one of the communication sockets 110 (FIG. 1) to a third-party data source, application, or the like over a network (e.g., WAN, etc.). In some embodiments, the one or more optimization criterion 910*b* may include desired characteristics specified by a user, a mission application, or otherwise identified by the trajectory planning application 108*j* based on historical data, preset targets, or the like. Such one or more optimization criterion 910*b* may include a quickest flight time, shortest path, lowest cost, lowest fuel/energy used, average altitude, tilt/yaw/pitch requirements, or the like.

According to embodiments, the air mobility platform 102 may include a deconfliction application 108*g* to deconflict a mission with other aerial vehicle flights, where the other aerial vehicle flights include non-native data. The air mobility platform 102 may apply rules and utilize the applications 108 to approve, modify, or deny the request for the mission. The approved or denied mission request may be provided to a user, an unmanned aerial vehicle system, an authoritative body, other aerial vehicles 103, or the like. The approval may include identification of a desired trajectory that has a threshold ratio of satisfaction of constraints of the request for the mission.

In some embodiments, the mission specification 904 includes some or all user tasks, mission constraints, and performance metrics necessary to comply with the mission. The mission specification 904 may include multiple mission tasks. For example, a mission specification 904 may define a mission procedurally, such as wherein task A is performed, followed by task B, and so on; or may be presented symbolically, such as with a symbolic statement that provides the assessment whether a candidate solution is suitable to successfully satisfy the mission, such as "all deliveries made." In some embodiments, the mission specification 904 may include a procedural mission in which one or more waypoints may be identified. It is understood that the one or more waypoints may comprise a sequence of a waypoints. The sequence of waypoints may comprise a manual selection and/or uploading of an ordered sequence of waypoints to be serviced by the flight. at least a portion of the waypoints may include coordinates used for deriving a position relative to a global or local reference frame, elevation related constraints, flyover versus non-flyover, and essential versus nonessential, by way of non-limiting example. In some embodiments, the waypoint characteristics may include a satisfaction measurement that is required of a particular mission. For example, an altitude constraint may be an at-constraint, requiring flight within some defined proximity of the altitude measure, or an above-constraint (or below-constraint), requiring flight any distance above (or below) the specified altitude measure.

Moreover, waypoint sequencing may include waypoint sequencing criteria such as a time budget or a fuel budget. Similarly, a reward function may be included as waypoint sequencing criteria, along with a subset of an overall set of waypoints that must be satisfied in line with such time, fuel, or reward constraints. As an example, a plurality of waypoints may be selected for a mission, but only a subset of those waypoints may be required for satisfaction of the mission specification. Other waypoints may not be required and may be bypassed to complete a mission. The obtained subset of waypoints may be determined by the maximum number of waypoints that may be suitably visited without exhaustion of a time, fuel, or reward budget.

Waypoints may include landmarks, such as roads or rivers, or other aspects of terrain which should be followed for between prescribed waypoints, such as to enhance safety on the ground, the probability of recovery in the event of mission failure or due to mission specification or a data collection requirement). Such a mission specification 904 may require more expressive maneuver libraries than simple flight plans that are accepting of straight-line segments and arcs, for example.

In at least some embodiments, task allocation between aerial vehicles 103 may form part of the mission specification 904 for each aerial vehicle 103. By way of example, a plurality of aerial vehicles 103 may be individually spatially distributed in an overarching mission specification 904 in a manner that best allows for a particular number of tasks to be divided up and carried out among the multiple aerial vehicles 103, subject to given constraints, in satisfaction of the mission and as part of the mission specification 904. Such constraints in the mission specification 904 for a plurality of aerial vehicles 103 may include that transportation costs are minimized, that transportation time is minimized, etc. Of course, other task allocation aspects may be utilized, such as total distance traveled, total or partial mission time, total fuel required, operator costs, risk costs, or accrued rewards, etc.

The mission specification 904 may be provided to the trajectory planning application 108*j* that cause the air mobility platform 102 to access a trajectory predictor application 910*a* and deconfliction application 108*g*. The trajectory planning application 108*j* may include operations or logic to execute trajectory planning for an aerial vehicle 103. Trajectory planning may include the process of calculating a detailed flight plan and/or trajectory that is feasible and which satisfies the requested mission and its correspondent mission specification. Candidate trajectory plans may vary dependent upon the specifications of an aerial vehicle 103, complexity of an environment, complexity of the mission specification, or complexity of other third-party information as identified herein.

In some embodiments, the trajectory planning application 108*j* may cause the air mobility platform 102 to determine trajectories based on information from third-party data sources, or the like. For instance, the trajectory planning application 108*j* may receive restriction conditions from the flight restriction planner application 990. The restriction conditions may include information identifying restricted airspaces, weather patterns, obstacles, airports, heliports, other landing facilities, controlled air spaces, stadium events, special use cases, NOTAM information, security restricted information, national parks or other nature reserves, contracts which may prohibit or otherwise direct airspace use, or the like. The trajectory planning application 108*j* may identify whether flight trajectories violate the restriction conditions. For example, the trajectory planning application 108*j* may cause the air mobility platform 102 to determine whether flight trajectories violate restricted airspace rules defining restrictions on flights within a geographical area. Such restricted airspace rules may define types of aerial vehicles or users permitted to fly aerial vehicles in a given geographical area, altitudes allowed in given geographical area, speeds allowed in given geographical area, or the like. In another aspect, the trajectory planning application 108*j* may cause the air mobility platform 102 to apply a restriction conditions received from external data accessible at least to the flight restriction planner application 990, such as a no-flight zone databases, terrain databases, weather databases, altitude databases, aerial vehicle capability databases, third party flight plans, and the like. Candidate trajectories may be selected in accordance with these external data aspects and with application of deconfliction application 108*g*, as described herein.

The trajectory planning application 108*j* may cause the air mobility platform 102 to determine predicted trajectories based on such information to, for example, avoid restricted airspaces, avoid severe weather patterns, and provide one or more optimization criterion 910*b*, such as quickest flight time, shortest distance, average or target altitude, or other one or more optimization criterion 910*b* that may be identified by a user preference or otherwise by the mission specification 904. Application of the one or more optimization criterion 910*b* may be referred to as pre-condition planning. This pre-condition planning may include receipt of and attempts to satisfy the mission specification 904, while adding any required mission limitations not supplied by the user, such as avoiding no fly zones. Pre-conditioning may also include performance of any initial checks on the correctness and feasibility of the mission specification. Upon satisfaction of pre-conditions, candidate trajectories may be generated as discussed herein.

The trajectory predictor application 910*a* may also cause the air mobility platform 102 to calculate realistic and feasible flight plans that satisfy the dynamic flight constraints of the mission specification, and supply those trajectory options to the trajectory planning application 108*j*. Such flight constraints may include performance envelope parameters such as minimum turning radius, minimum forward speed, maximum speed, fuel life, battery life, and any other flight restrictions, such as operationally defined or airspace related environmental restrictions that may affect available/executable flight maneuvers/primitives, some or all of which may be available from a flight library that may be specific to aerial vehicles 103, such as based on make, model, fuel, etc. In some embodiments, trajectory predictor application 910*a* may additionally cause the air mobility platform 102 incorporate no fly zones and safe distance separations from structures and other aerial vehicle. For example, the trajectory predictor application 910*a* may be utilized with deconfliction application 108*g* to identify trajectory predictions which avoid conflicts. As such, the trajectory predictor application 910*a* may include or access one or more maneuver libraries, as disclosed herein, in which a family or collection of maneuvers and a description of when and how the maneuvers may be executed by a particular aerial vehicle to generate candidate predicted trajectories.

Moreover, the trajectory planning application 108*j* may cause the air mobility platform 102 to cause candidate predicted trajectories that are identified by the trajectory predictor application 910*a* to be subjected to the deconfliction application 108*g*. The deconfliction application 108*g* may cause the air mobility platform 102 to identify potential or actual conflicts with the one or more predicted trajectories from the trajectory predictor application 910*a* and with predicted trajectories of other aerial vehicle so as to avoid in-flight conflicts. The deconfliction application 108*g* may modify or prohibit certain predicted trajectories until an optimal or desired trajectory is identified.

For example, the deconfliction application 108*g* may cause the air mobility platform 102 to access information describing flight plans and predicted flight trajectories for two or more distinct aerial vehicles 103. In some embodiments, the deconfliction application 108*g* may cause the air mobility platform 102 to modify trajectories to avoid conflict between the flight plans for those two or more aerial vehicles. Such conflicts would otherwise prevent mission success in accordance with the provided mission specification 904. The deconfliction application 108*g* may cause the air mobility platform 102 to resolve such airspace conflicts, while ensuring that other mission specification constraints are still satisfied.

In some embodiments, the deconfliction application 108*g* causes the air mobility platform 102 to resolve flight plan conflicts as part of its provided functionality. Such conflicts may require strategic separation in preflight planning, and a tactical separation during flight. As such, the deconfliction application 108*g* may cause the air mobility platform 102 to monitor in-flight conformance with flight planning, such as using available monitoring technologies. As airspace congestion increases, deconfliction preflight planning and conformance monitoring both may increase in processing difficulty. As such, centralized or decentralized coordination of flight planning may be performed in order to monitor and ensure conformance.

Once one or more target flight plans are identified, the air mobility platform 102 may output a suitable flight plan 902 which may identify one or more candidate flight trajectories which satisfy the mission specification 904, or provide a rejected mission request response 922 which may include reasons why the flight plan for the input mission specification was unable to be formulated. The air mobility platform 102 may generate the output to one or more receiving parties, such as a user computing device associated with a request and/or an authorization or governing bodies, such as the FAA.

In accordance with embodiments, the flight plan 902, which may include an output candidate flight plan, may be generated by the trajectory planning application 108*j* and may satisfy the mission specification 904. The flight plan 902 may be subjected to various restriction conditions pre-flight and during flight, such as approval/monitoring by a UTM system, in which various restrictions and rules for aerial vehicles may be applied to the subject aerial vehicle while in flight. Likewise, the trajectory planning application 108*j* or an aerial ground control ("ground control") may perform functions during execution of a mission specification, such as monitoring for restricted airspace intrusion, insuring compliance with the trajectory plan requested, aerial vehicle sensor monitoring, monitoring for flight interruptions (e.g., such as priority or unplanned emergency flights), and so on. In an aspect, during flight, ground control and the air mobility platform 102 may provide monitoring compliance or other services such that can be deployed in various forms (e.g., hosted purely in the cloud or distributed between the cloud and ground control).

In some embodiments, the air mobility platform 102 may apply pre-conditioning via one or more optimization criterion 910b. Similarly, the air mobility platform 102 may apply post condition planning 910c. Following generation or non-generation of candidate trajectories that satisfy the mission specifications 904, post conditioning planning may be applied by the air mobility platform 102. For example, if a mission is infeasible as a result of failure to identify any candidate flight trajectories, the air mobility platform 102 may report the failure as the output rejected mission request response 922, which may include an explanation of post condition planning 910c why the mission is infeasible. Such infeasibility may occur because the mission is over-constrained, there is no available flight path, or conflicts have not been suitably resolved, by way of non-limiting example.

As the post condition planning 910c, if the mission is available, the predicted trajectory and flight plan selected may be issued as the flight plan 902, which may include one or more candidate trajectories, any limitations on the flight plan, or aspects of the mission specification that went unsatisfied. Further, automated negotiation with flight plans of other aerial vehicles 103 may be monitored, such as via the deconfliction application 108g, such that changes to those flight plans may also occur, or be known, as needed.

As an example, post condition planning 910c which may, in some embodiments, be applied by the air mobility platform 102 is related to tactical deconfliction. As a non-limiting example, the trajectory planning application 108j may apply post condition planning 910c based on a vehicle to vehicle de-confliction requirement to the flight plan/trajectory. For instance, the flight plan 902 may be allowed with additional post conditions that may govern or otherwise actuate re-planning or rerouting of an aerial vehicle over a single or multiple segments of the flight while in-flight. Conditions of the post condition planning 910c may include unexpected priority flights (e.g., medical emergency, public safety, or national security flights, etc.), unexpected weather conditions, or the like. Re-planning may result in an output updated flight plan 902, which may be executed in-flight by suitably equipped, sensor-based vehicle-to-vehicle course corrections, or by ground station or ground control based course corrections, or by UTM based tactical control, as necessary.

Figure 10:
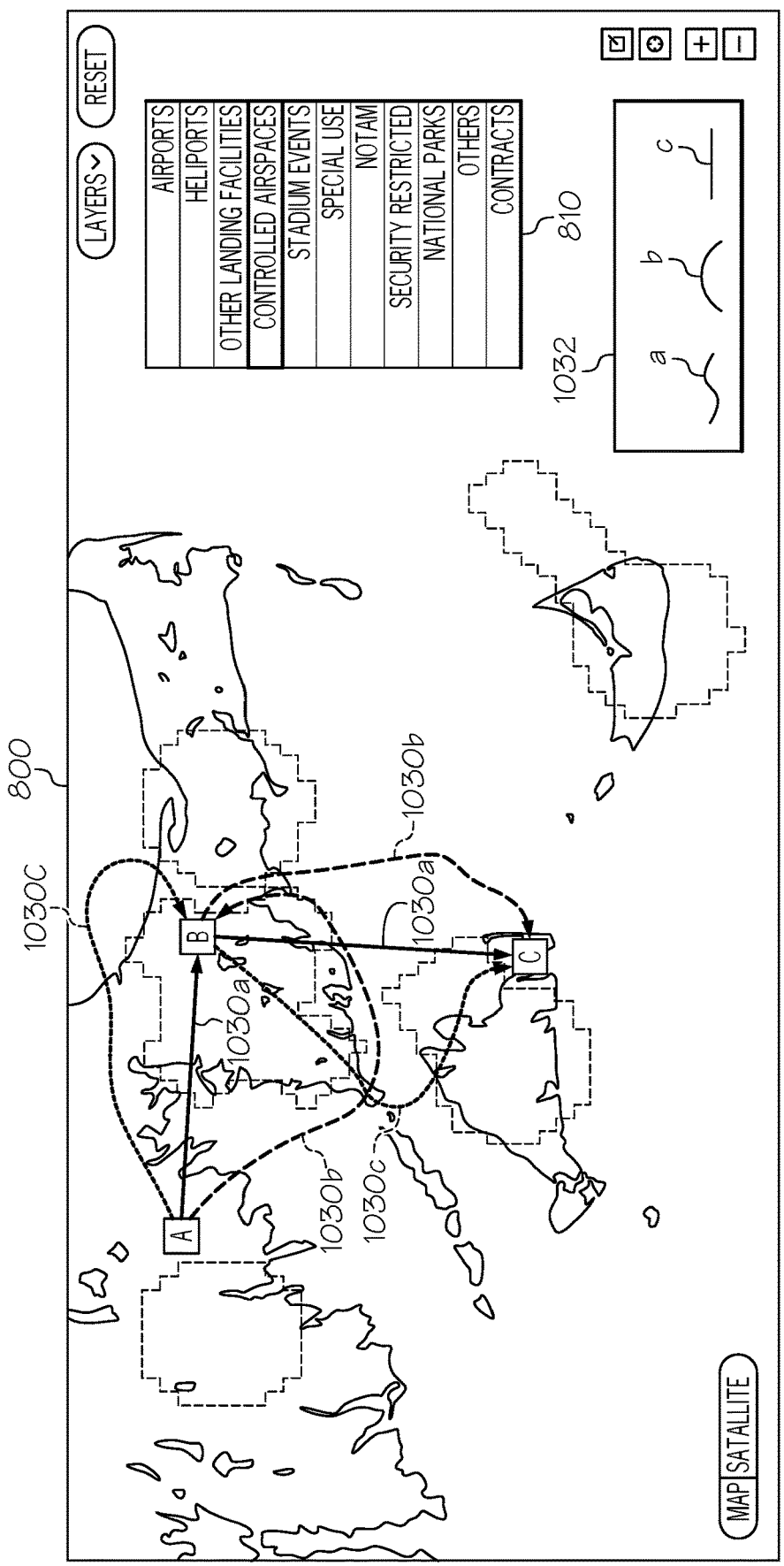
FIG. 10 depicts a user interface of FIG. 8 displaying alternate flight trajectories, according to embodiments provided herein.

FIG. 10 depicts another rendering of the user interface of FIG. 8 displaying alternate flight trajectories, according to embodiments provided herein. The mission specification 904 (FIG. 9) input by the user may include tasks that the aerial vehicle 103 is expected to complete, such as one or more waypoints or checkpoints to be visited, and/or various time and/or ordering constraints to visit those waypoints. By way of example, the mission specification 904 may identify an aerial vehicle 103 is to visit an ordered sequence of waypoints, labeled A, B, and C. In such an example, there may be one or more feasible trajectories that allow for the visiting of the sequence of waypoints. However, a particular trajectory may have excellent performance metrics, and may thereby be considered a better option than all other candidate trajectories by the trajectory planning application 108j.

As such, candidate trajectories may initially be computed from a list of feasible trajectories provided by the trajectory predictor application 910a in comparison by the trajectory planning application 108j to the mission specification 904. That is, a family of movement parameters may be applied to the mission specification 904 by the trajectory planning application 108j from the trajectory predictor application 910a, in order to create a set of possible full trajectories 1030a, 1030b, 1030c that accomplish tasks identified in the mission specification 904, while adhering to government regulations, avoiding restricted airspace, avoiding stadium events, or the like.

In the illustrated example, the simplest feasible candidate trajectory 1030a may be to connect waypoints A, then B, then C with straight-line segments. However, while such a candidate trajectory may be appropriate for certain types of aerial vehicles 103. For example, for a quad rotor aerial vehicle that can transition angularly between segments. The present type of aerial vehicle 103 that is the subject of the mission specification 904 may be unable to produce such a flight path or predicted trajectory due to performance and/or dynamics limitations of the aerial vehicle 103. For a certain type of aerial vehicle 103, a candidate trajectory may be feasible, but may take considerably more maneuvering time than an alternative trajectory.

In some embodiments, a maneuvering library or motions library 1032 may be provided specific to the aerial vehicle for which the mission is requested. The motions library 832 may identify maneuvers or a plurality of maneuvers 1032a, 1032b, 1032c. The maneuvers 1032a-1032c may include rectilinear and curved motions, takeoff and landing capabilities, splines, polynomials or Bezier curves, motions developed from analyzing historical trends in aerial vehicle performance data, speed or maneuverability characteristics, or other motions or motion characteristics related to an aerial vehicle. In another example, the collection of maneuvers 1032a, 1032b, 1032c, and a description of when and how motion primitives or maneuvers of the motions library 1032 may be executed by a particular aerial vehicle 103 may be provided to the trajectory planning application 108j from the mission specification 904 or may be identified by the trajectory planning application 108j by accessing a data store containing information for a particular aerial vehicle, make and model of aerial vehicle, or the like.

In some embodiments, trajectory predictor application 910a may cause the air mobility platform 102 to access motions library 832 to satisfy the mission specification 904 (FIG. 9) and constraints for the particular aerial vehicle. These maneuvers 1032a, 1032b, 1032c for a specific aerial vehicle 103, may then be used by the trajectory planning application 108j to formulate the set of candidate trajectories, wherefrom a suitable trajectory, which may be the trajectory with a ratio of satisfaction of mission constraints that exceeds a predetermined threshold may be selected. If no candidate trajectories satisfy at least a portion of the mission specifications 904, a flight plan failure may be returned by the trajectory planning application 108j.

As such, the air mobility platform 102 may utilize the trajectory planning application 108j to formulate a candidate trajectory in an iterative manner using candidate maneuvers 1032a, 1032b, 1032c provided from the trajectory predictor application 910a. Separately from generation of the candidate trajectories and from selection of the best-case trajectory, the deconfliction application 108g may cause the air mobility platform 102 to provide anticipated conflicts to the trajectory planning application 108j for each candidate trajectory the trajectory planning application 108j may intend to select. The deconfliction application 108g may be applied to all candidate trajectories generated which otherwise would satisfy the mission specification 904; or, such as to save on unnecessary processing, deconfliction application 108g may be applied only to a best-case subset from the candidate trajectories. Further, deconfliction application 108g may communicate weather patterns (which may include access to weather conditions from third-party datasets), restricted fly zones (such as may occur in real time), etc.

The trajectory planning application 108j may cause the air mobility platform 102 to insert additional task, goals, and/or requirements into a mission specification 904, such as avoiding no flight zones or deconfliction with all other air traffic; safety constraints, fuel requirements, structural impediments, obstacles, terrain or ground hazards, availability of contingency plans, and so on. Given a particular mission, the mission specification 904 comprises the data that enables an assessment of whether a candidate trajectory 1030a, 1030b, 1030c can successfully complete the mission.

The trajectory planning application 108j may be employed before or during flight to optimize trajectories, deconflict trajectories, and handle changes to restrictions. During a flight of an aerial vehicle 103, the aerial vehicle 103 may execute a previously determined desired flight plan. An interrupting condition may occur that may require modification of the flight plan in order to avoid conflicts, comply with regulation, and/or avoid hazards. For instance, a natural disaster (e.g., wildfire, etc.) may create unexpected weather conditions, necessitate mission critical flights from first responder systems (e.g., emergency medical aerial vehicles, firefighting aerial vehicles, etc.), or the like. Such interrupts may take precedent over the mission of the aerial vehicle 103 as a matter of public safety, policy, regulations, or the like. As such, the trajectory planning application 108j may cause the air mobility platform 102 to construct alternative flight plans that may be pushed to the user computing device 202 (FIG. 2) or other device and/or to aerial vehicles 103.

Figure 11:
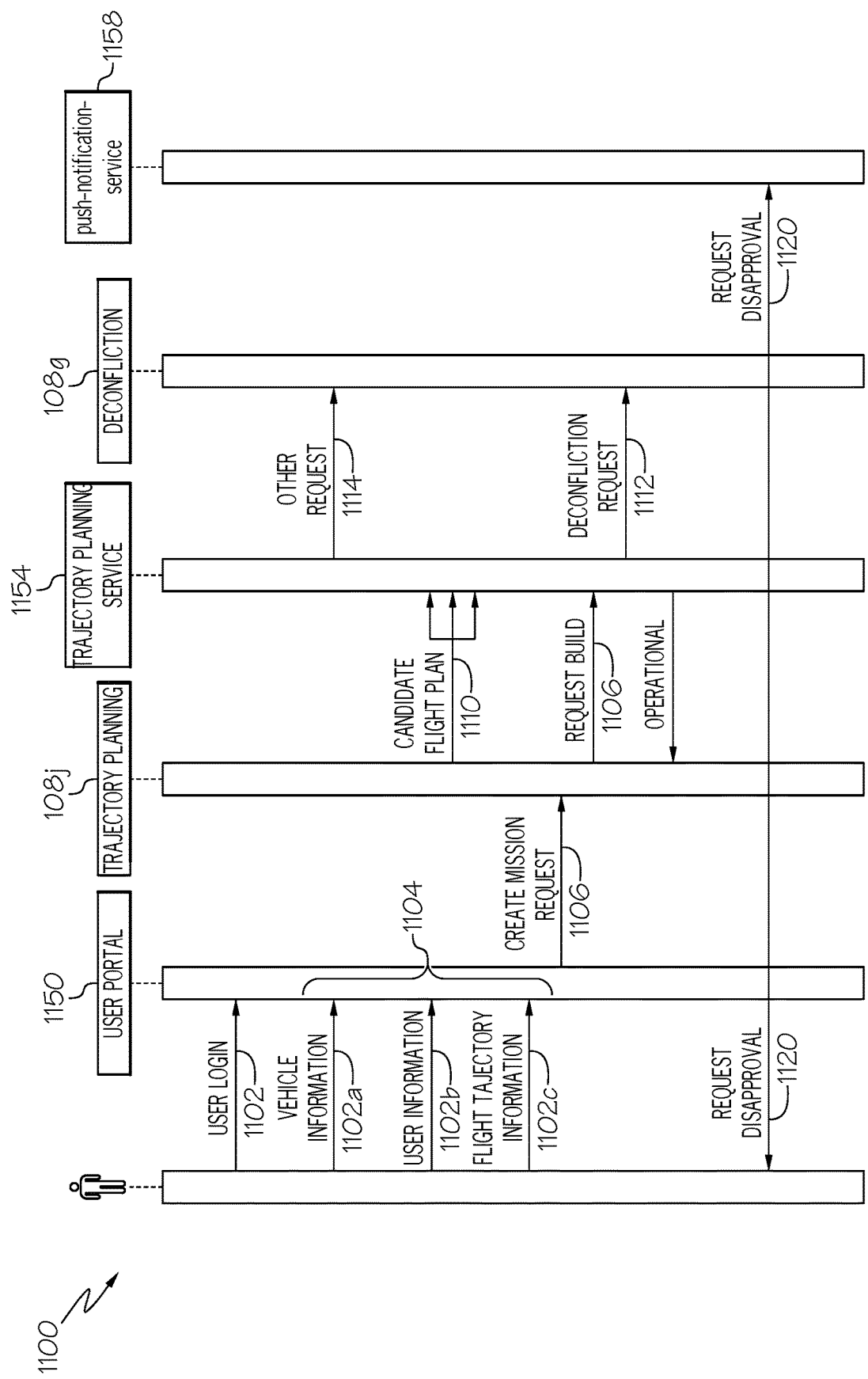
FIG. 11 depicts a methodology for trajectory approval and enforcement, according to embodiments provided herein.

FIG. 11 depicts a methodology for trajectory approval and enforcement, according to embodiments provided herein. As illustrated, a method 1300 may be executed by the air mobility platform 102 may provide user portal services via a user portal 1150, trajectory projecting service provided by trajectory planning application 108j, deconfliction services provided by deconfliction application 108g, and/or push-notification services 1158. A user may login at 1102 via a user interface on a user computing device 202 that communicates with a user portal-service 950. The user computing device 202 may submit mission specification information 1104, such as may include user and aerial vehicle information, and/or a data related to a mission. The mission specification information 1104, may include, for example, vehicle information 1104a pertaining to an aerial vehicle 103. Vehicle information 1104a may include a vehicle identifier, a make and model, a request to associate an aerial vehicle 103 to a user's account or to a particular flight plan, etc. In another aspect, user information 1104b may include input received from user computing device 202, information from user profiles, or other information related to a user. The flight trajectory information 1104c may be received via a user drawing a trajectory on an interactive map displayed by a user interface (e.g., such as shown in FIG. 10). It is noted, however, that the user may identify a trajectory in various other ways such as providing text, interaction with drop down menus, radio buttons, etc. Moreover, a user may select a previous flight trajectory from a history associated with a user.

Information received at the user portal 1150 may a create mission request 1106 that may be sent to the trajectory planning application 108j. As such, the one or more mission requests 1106 corresponded to the mission specific information 1104 for a mission (e.g., a mission request) may constitute a request for a given flight plan/trajectory in satisfaction of the requested mission.

The trajectory planning application 108j may cause the air mobility platform 102 to build a mission specification from the create mission requests 1106 and the correspondent mission specification information 1104 by creating a candidate flight plan 1110 via the trajectory planning application 108j. The trajectory planning application 108j may cause the air mobility platform 102 to interact with trajectory projecting service 1154 as well as deconfliction application 108g. For example, trajectory panning services 1152 may cause the air mobility platform 102 to provide a deconfliction request 1112 with other flight plans and other requests 1114 for to other flight restrictions (e.g., weather, structures, restricted airspace etc.). The trajectory projecting service 1154 may be provided as a third party service for trajectory planning, such as for manned aerial vehicles. The communication with the trajectory projecting service 1154 may allow the air mobility platform 102 via the trajectory planning application 108j to perform operations while coordinating with manned aerial vehicle planning services.

As an example, the user profile with the air mobility platform 102 may include a mission request, flight details, flight capabilities for a given aerial vehicle 103 for which a mission request is made, etc. Moreover, the user profile may further include data stemming from one or more tools provided by the trajectory planning application 108j, such as 2D or 3D geometric drawing tools on which a user may request a particular mission, mark waypoints, request altitudes, request flight times, or the like.

Figure 12:
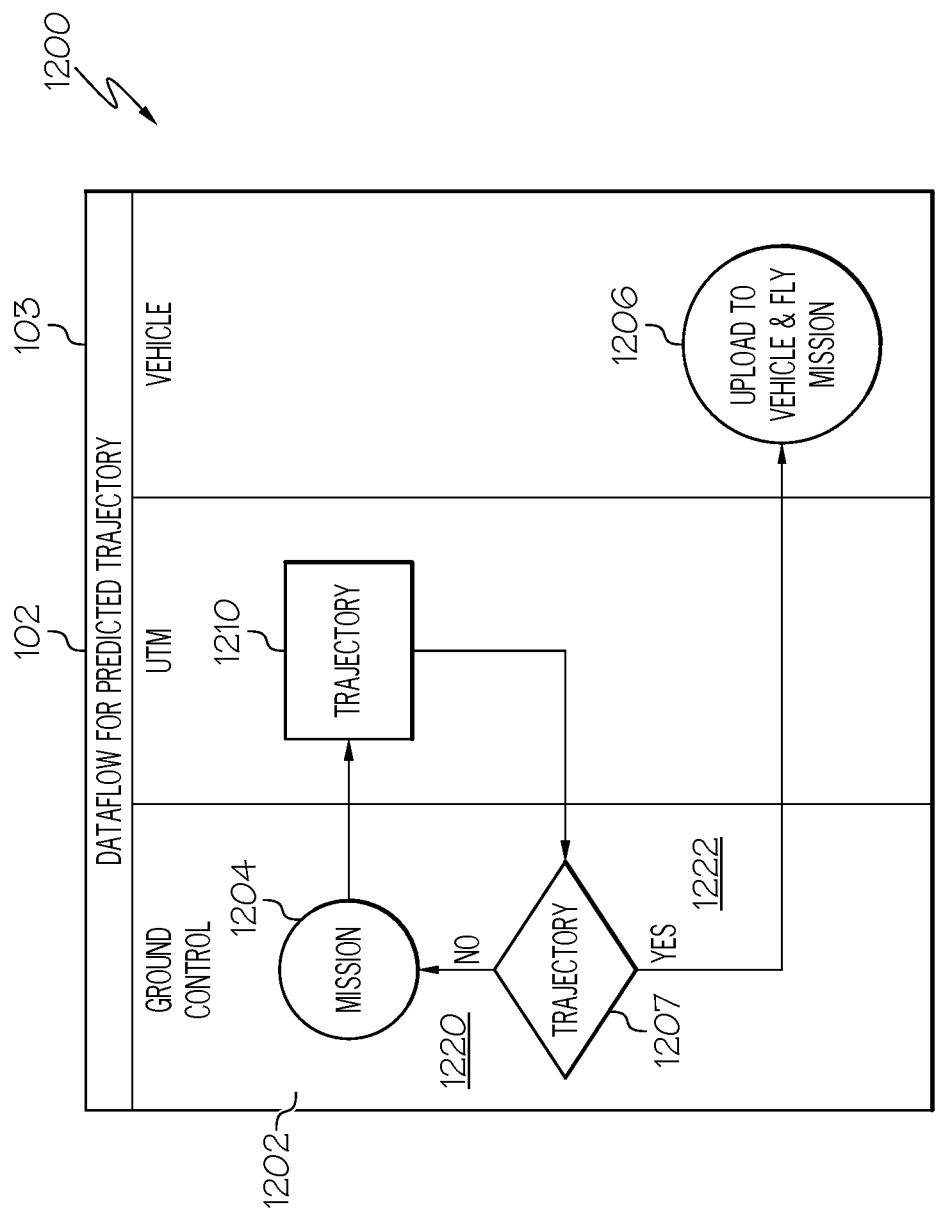
FIG. 12 depicts a methodology for providing services to determine flight trajectories, according to embodiments provided herein.

FIG. 12 depicts a methodology 1200 for providing services to determine flight trajectories, according to embodiments provided herein. According to embodiments, a ground control 1202, may employ one or more networks to generate a mission plan 1204 which may identify a mission specification, waypoint sequencing, mission criteria, requests, etc. The ground control 1202 may transmit the mission plan 1204 to air mobility platform 102 which may perform trajectory planning 1210. When the air mobility platform 102 performs trajectory planning 1210, it may determine whether a suitable trajectory exists. A response may be provided to ground control 1202. The ground control 1202 may identify whether a suitable trajectory exists at 1207 based on the response from the air mobility platform 102. The ground control 1202 may identify a failed request message at 1220 and may generate a new mission plan 1204.

If the ground control 1202 identifies that the trajectory does exist as indicated at 1220, the ground control 1202 may uploaded the mission plan to the aerial vehicle and instruct the aerial vehicle to fly the mission at 1206. It is noted that the trajectory and mission specification 904 may be uploaded by ground control 1202 to aerial vehicle 103, a remote computer, etc. In at least some embodiments, an aerial vehicle 103 may comprise an autopilot or may be flown through ground control 1202, user computing device 202 (FIG. 2), etc.

Figure 13:
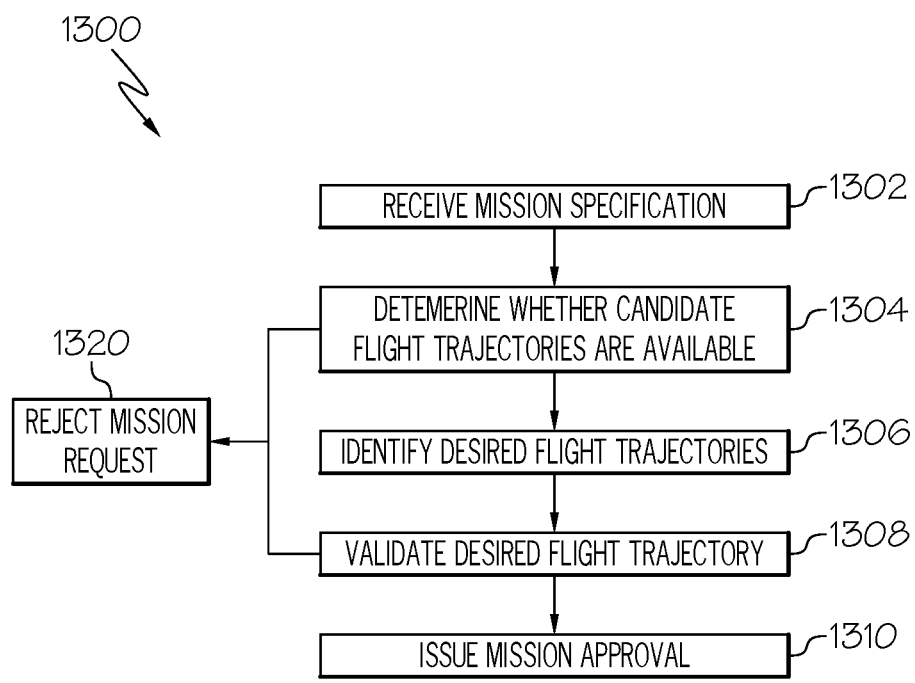
FIG. 13 depicts a flow diagram illustrating trajectory approval, according to embodiments described herein.

FIG. 13 depicts a flow diagram illustrating trajectory approval, according to embodiments described herein. In embodiments, air mobility platform 102 may perform the process 1300 via applications 108. For example, the trajectory planning application 108j may cause the air mobility platform 102 to receive a mission request and may approve or deny the mission request.

At 1302, the process 1300 may receive a mission request which may include a specification. The mission specification may define a waypoint sequence, mission criteria, user identifications, aerial vehicle information, etc. At block 1304, the process 1300 may determine whether one or more candidate flight trajectories are available. Determining whether one or more candidate flight trajectories are available may include modeling a plurality of maneuvers from a motions library for the unmanned aerial vehicle to identify the one or more candidate flight trajectories to the at least one waypoint which satisfy at least one restriction condition and do not conflict with a flight plan for at least one other aerial vehicle. In embodiments, the method may generate (or attempting to generate) candidate flight trajectories that satisfy the mission specification, satisfy restriction conditions, and do not conflict with other aerial vehicle flights. In embodiments, the trajectory planning application 108j may cause the air mobility platform 102 to generate candidate flight trajectories based on the mission specification, aerial vehicle 103 specific performance data which may identify a motions library for the aerial vehicle, information from third party data sources 104, or other stored information. For instance, the trajectory planning application 108j may cause the air mobility platform 102 to utilize the motions library 1032 (FIG. 10) to identify available motions based on rules, curvature movements, etc. In at least some embodiments, the motions library 1032 may include information received from third party data sources 104. The motions library 1032 may include aerial vehicle specific sets of index maneuvers that may define an aerial vehicle model.

In another aspect, the trajectory planning application 108j may cause the air mobility platform 102 to generate candidate flight trajectories based at least in part on restrictions identified by third party data sources 104 or other stored information. As an example, restrictions may include restrictions based on weather forecasting, no-flight zones or restricted airspace, interfering structures, power-line maps, bodies of water, stadium events, national security, etc.

According to some embodiments, the trajectory planning application 108j may cause the air mobility platform 102 to generate candidate flight trajectories based on modeling combinations of maneuvers to determine whether or not candidate flight trajectories exist. Modeling may include utilizing kinematic modeling based on the mission specification information. Modeling utilizing kinematic modeling may include simulating a trajectory based on an aerial vehicle's desired ground track, the effects of wind, weather, and altitude on performance in view of mission requirements, the resulting air speed, ground speed, and/or energy consumption in view of particular aspects of the mission specification, etc. In some embodiments, the kinematic modeling may vary depending upon aerial vehicle information. Aerial vehicle information may include information identifying one or more of a power type (e.g., electric or gas powered), a weight of the battery or liquid fuel (dependent upon aerial vehicle type), propeller/wing and motor dynamics (e.g., fixed wing aerial vehicles, quad rotor aerial vehicles, number of rotors, number of wings, airframe masts, balance capabilities, etc.), an aerial vehicle payload, available maneuvers modified in light of the payload, variances in velocity for a given payload, aerial vehicle range, speed information (e.g., acceleration, maximum speed, thrust, etc.), available hover time, optimum and modified turning radii, etc.

In another aspect, the trajectory planning application 108j may cause the air mobility platform 102 to generate candidate flight trajectories based at least in part on mission specifications or criteria and information pertaining to the external environment, e.g., terrain, deconfliction, weather, etc. For instance, trajectory planning application 108j may cause the air mobility platform 102 to generate candidate flight trajectories based at least in part on requisite stopping distance and climb rate for a given aerial vehicle, limits on forward speed due to collision avoidance system performance capabilities, terrain, flight paths of other aerial vehicles, etc. The air mobility platform 102 may receive weather forecasting from third party data sources 104 or may perform weather forecasting. Weather forecasting may include current weather forecast data, predictive modeling, predictive convective, weather algorithms, squall lines, and other weather-related safety predictive capabilities.

It is understood that if the air mobility platform 102 identifies that no trajectories exist to fulfill a mission request, the method 1300 may proceed to block 1320 and may reject the mission request. In such examples, the air mobility platform 102 may identify a failed the mission request due to conflicts with other aerial vehicles, violate of rules, or the like. In some examples, the method 1300 may generate messages indicating the mission is rejected to user computing device 111, regulatory bodies, etc. The message may include a reason for the rejection, suggestions for modifications to a mission request, or the like.

At block 1306, the process 1300 may identify one or more desired flight trajectories from candidate flight trajectories. A desired flight trajectory may be identified through modeling as described with reference to block 1304. In embodiments, a desired flight trajectory may be identified based on user preferences, performance metrics, or the like. Such user preferences or performance metrics may be identified by a mission specification and may include preferred altitudes, fuel consumption data, flight time, time between one or more waypoints, time at a particular waypoint, etc. It is understood that the air mobility platform 102 may identify one or more desired flight trajectories, a set of ranked flight trajectories, etc. In an example, the air mobility platform 102 may identify a set of flight trajectories that may each achieve a desired performance metric. The air mobility platform 102 may receive user input as a selection to identify a selected flight trajectory from the one or more desired flight trajectories.

At block 1308, the process 1300 may validate the one or more desired flight trajectory. For example, the air mobility platform 102 may preform deconfliction, simulations, or the like to verify that the desired flight trajectory is feasible. It is understood that validation may comprise a redundancy check. In some embodiments, the air mobility platform 102 may perform validation before or during a flight. The air mobility platform 102 may perform validation to verify a flight trajectory based on restrictions or other environmental information (e.g., weather forecasting, no-flight zones, interfering structures, power-line maps, bodies of water, etc.). It is understood that the air mobility platform 102 may determine that one or more desired flight trajectories are invalid and may proceed to 1320 to reject the mission request.

At block 1310, the process 1300 may issue a mission approval. In embodiments, the air mobility platform 102 may generate messages indicating the mission is approved to user computing device 111, regulatory bodies, etc. The mission approval may identify a selected flight trajectory, speeds, temporal information, and the like.

Figure 14:
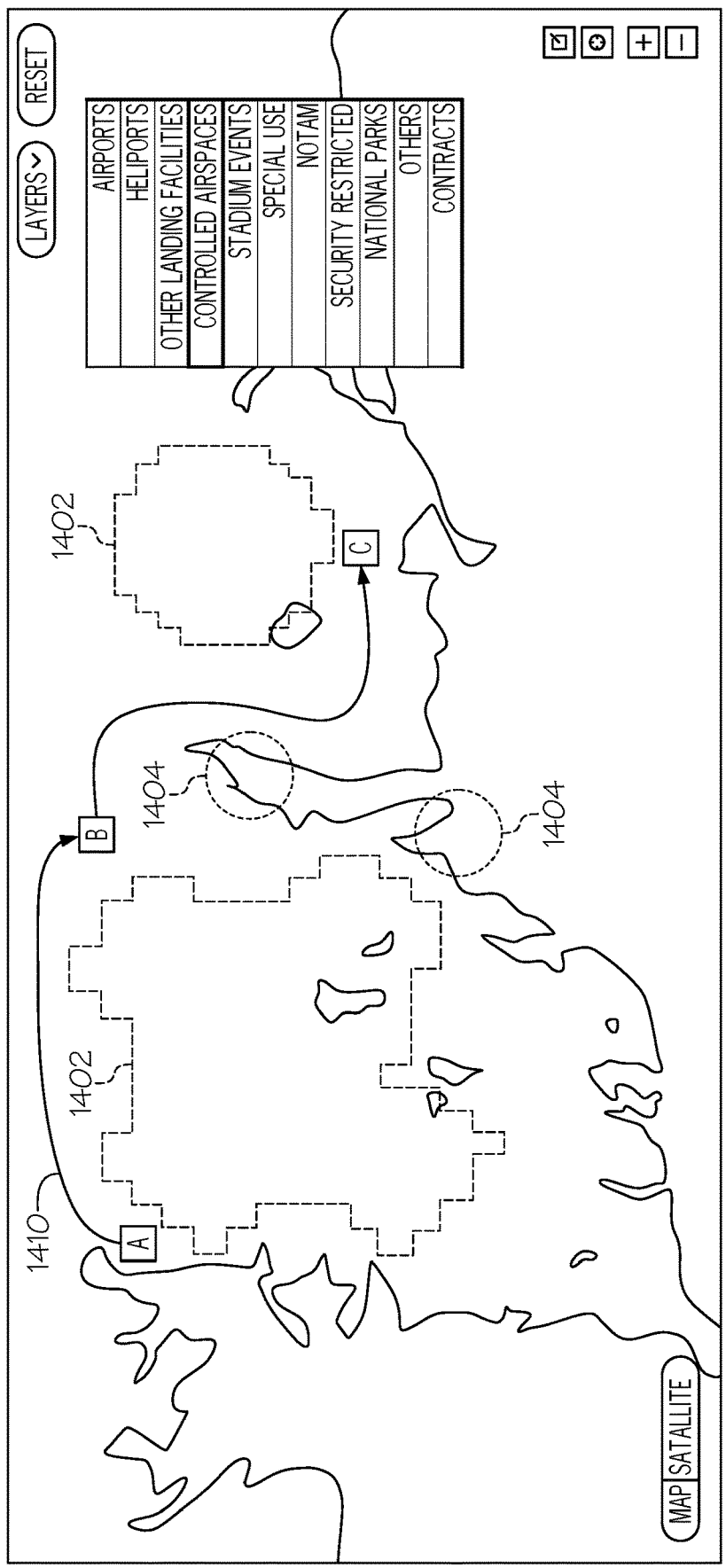
FIG. 14 depicts a user interface on a remote computing device displaying alternate flight trajectories, according to embodiments provided herein.

FIG. 14 depicts a user interface 800 on a remote computing device displaying alternate flight trajectories, according to embodiments provided herein. As illustrated, the user interface 800 renders a controlled airspace 1402 (which may identify a no-fly zone) and terrain 1404 for generation of a trajectory 1410 between the mission waypoints A, B, and/or C. The waypoints A, B, and/or C may be specified as required, optional, preferred, or the like. For instance, required waypoints must be satisfied in any trajectory such that failure to do so results in a failed missions. non-required waypoints may be provided for a flight plan with the non-required waypoints are optional or preferred, but not required to fulfill the flight plan. In some embodiments, the waypoints may be require absolute sequence or optional sequence. Specifically, certain flight plans may require waypoints in a specified order where failure to meet the order results in failure. In other flight plans, a certain sequence or sub-sequence may be preferred but failure to meet the preferred order will not result in failure.

In embodiments, the air mobility platform 102 may apply rulesets and co-resident or outside data related to restrictions. For example, the air mobility platform 102 may generate the trajectory 1410 to avoid controlled airspace 1402 and/or terrain 1404. Additionally, the rulesets may deconflict the flight between waypoints A, then B, then C, with the flight plans of other aerial vehicle, as discussed above. The resultant simulated and approved flight plan is illustrated in FIG. 14.

Figure 15:
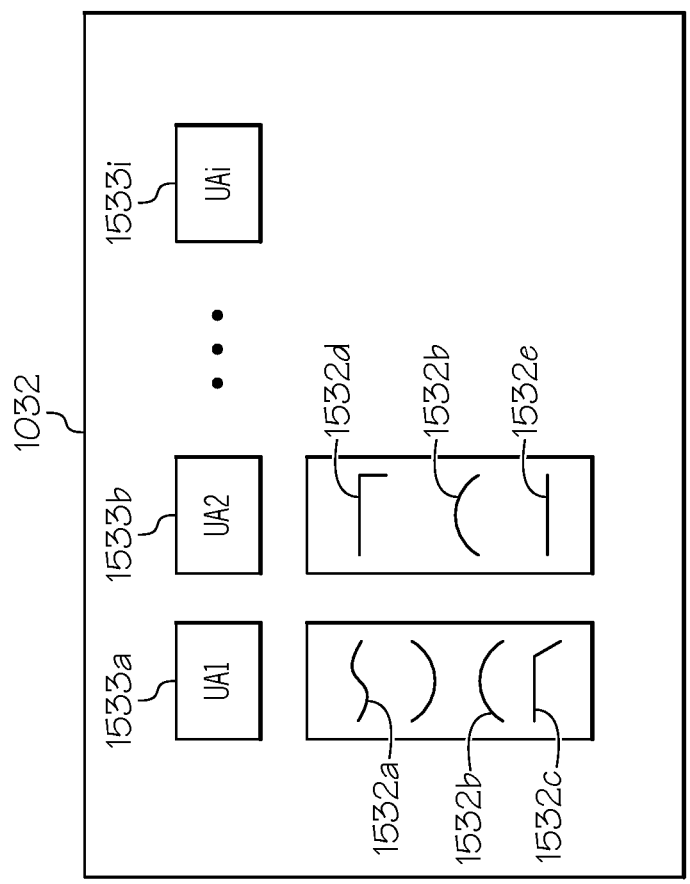
FIG. 15 depicts a motions library, according to embodiments provided herein.

FIG. 15 depicts a motions library 832, according to embodiments provided herein. As illustrated, the motions library 832 may include a plurality of indexed maneuvers 1532a, 1532b, 1532c, 1532d, 1532e such as may be delineated by aerial vehicle type 1533a, 1533b, 1533i, etc. The indexed maneuver 1532a, 1532b, 1532c, 1532d, 1532e available may vary based upon external data indication restrictions, such as weather conditions, and as such the motions library 832 may include direct or indirect connectivity to external data sources, such as using the multi-level communications bus discussed throughout. Further corresponding to these indexed maneuvers 1532a, 1532b, 1532c, 1532d, 1532e may be control signals 1302, which effectuate such maneuvers for each particular aerial vehicle.

The motions library 832 may include maneuver feasibility criteria in light of restriction criteria, such as when certain maneuvers are only available in certain weather conditions, at certain altitudes, at certain times of day, or the like, for certain aerial vehicles 103. More particularly, maneuvers 1532a, 1532b, 1532c, 1532d, 1532e may include sets of lines, parametric curves, angular motions, etc., and the availability of such maneuvers 1532a, 1532b, 1532c, 1532d, 1532e may vary with operation conditions, such as may be indicated from external data sources (e.g., third party data sources 104). In some embodiments one or more of the maneuvers 1532a, 1532b, 1532c, 1532d, 1532e may be the result of mathematical formulae indicative of certain capabilities of the aerial vehicle 103. In some embodiments one or more of the maneuvers 1532a, 1532b, 1532c, 1532d, 1532e may be associated with particular behaviors of the aerial vehicle 103, such as takeoff, hovering, landing, emergency landing, climbing and descending, and/or leveling.

Figure 16C:
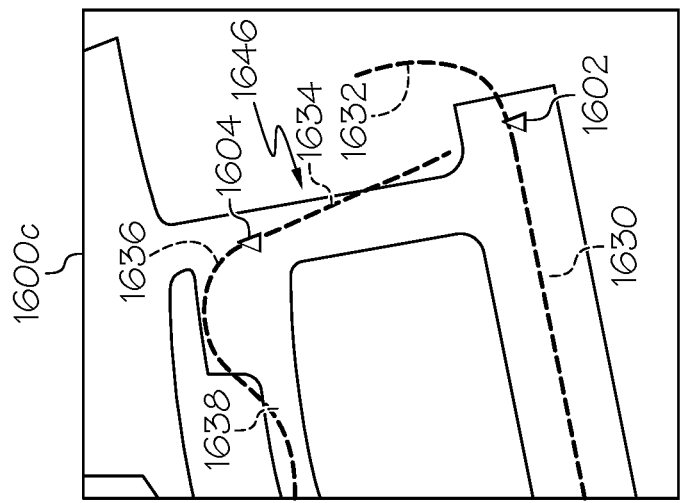
FIGS. 16A-16C depict respective user interfaces illustrating modifications to maneuvers and maneuver characteristics for an aerial vehicle, according to embodiments provided herein.
Figure 16B:
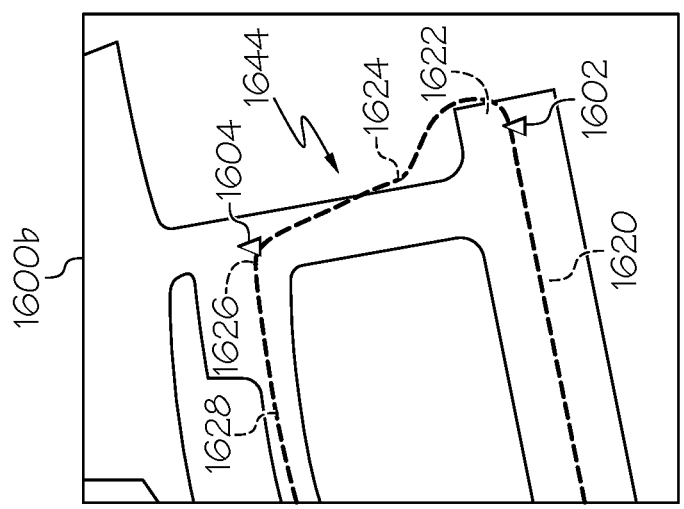
Figure 16A:
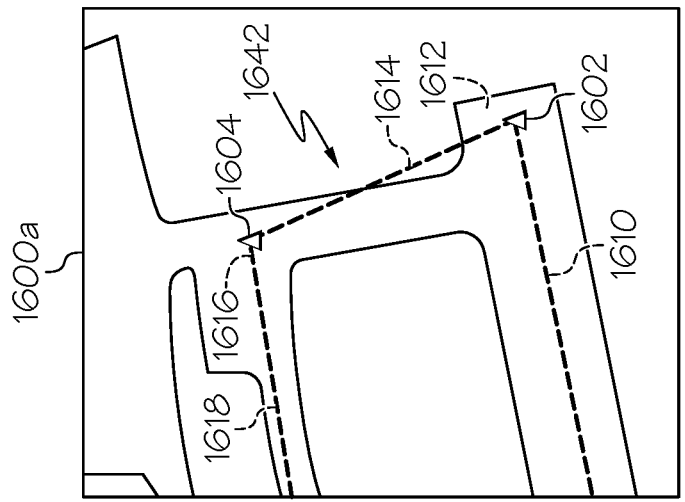

FIGS. 16A-16C depict respective user interfaces 1600a, 1600b, 1600c illustrating modifications to maneuvers and maneuver characteristics for an aerial vehicle 103, according to embodiments provided herein. In an example, a mission plan may include travel to waypoint 1602, travel to waypoint 1064, and travel away from waypoint 1604. The trajectory planning application 108j may generate a first flight trajectory 1642, which may include a plurality of fight maneuvers selected from the motions library 832. The flight maneuvers may include a first descending maneuver 1610, a first turning radius maneuver 1612, a second descending maneuver 1614, a second turning radius maneuver 1616, and a third descending maneuver 1618. The first descending maneuver 1610, second descending maneuver 1614, and third descending maneuver 1618 may each define a decent rate over a distance. As illustrated, from an aerial view, the first descending maneuver 1610, second descending maneuver 1614, and third descending maneuver 1618 may be generally straight lines of travel. In embodiments, the motions library 832 may include an indexed maneuvers that correspond to one or more of first descending maneuver 1610, second descending maneuver 1614, and third descending maneuver 1618.

The first turning radius maneuver 1612 may define a turning radius that directs the aerial vehicle 103 to turn a specified angle between the first descending maneuver 1610 and the second descending maneuver 1614. Similarly, the second turning radius maneuver 1616 may define a turning radius that directs the aerial vehicle 103 to turn a specified angle between the second descending maneuver 1614 and the third descending maneuver 1618. In some embodiments, the motions library 832 may include an indexed maneuvers that correspond to one or more of first turning radius maneuver 1612 and second turning radius maneuver 1616.

Before or during flight of the aerial vehicle 103, trajectory planning application 108j may analyze aerial vehicle 103 performance, travel of other aerial vehicles, weather, alters, or other information from third party data sources 104 and may modify the first flight trajectory 1642 to the second flight trajectory 1644. For instance, the trajectory planning application 108j may cause the air mobility platform 102 to determine that certain weather conditions or aerial vehicle 103 information may prohibit completion of the first flight trajectory 1642. As an example, the trajectory planning application 108j may cause the air mobility platform 102 to determine that the aerial vehicle 103 cannot execute the first turning radius maneuver 1612 and/or the second turning radius maneuver 1616. As such, the trajectory planning application 108j may cause the air mobility platform 102 to generate the second flight trajectory 1644, which may include a plurality of fight maneuvers selected from the motions library 832 that may form the second flight trajectory 1644. The second flight trajectory 1644 may include a first descending maneuver 1620, a first turning radius maneuver 1622, a second descending maneuver 1624, a second turning radius maneuver 1626, and a third descending maneuver 1628. The first descending maneuver 1620, second descending maneuver 1624, and third descending maneuver 1628 may each define a decent rate over a distance. As illustrate, from an aerial view, the first descending maneuver 1620, second descending maneuver 1624, and third descending maneuver 1628 may be generally straight lines of travel. In embodiments, the motions library 832 may include an indexed maneuvers that correspond to one or more of first descending maneuver 1620, second descending maneuver 1624, and third descending maneuver 1628.

The first turning radius maneuver 1622 may define a turning radius that directs the aerial vehicle 103 to perform travel along a specified curvature between the first descending maneuver 1620 and the second descending maneuver 1624. Similarly, the second turning radius maneuver 1626 may define a turning radius that directs the aerial vehicle 103 to turn a specified curvature between the second descending maneuver 1624 and the third descending maneuver 1628. In some embodiments, the motions library 832 may include an indexed maneuvers that correspond to one or more of first turning radius maneuver 1622 and second turning radius maneuver 1626.

In embodiments, before or during flight of the aerial vehicle 103 aerial vehicle 103 may modify the second flight trajectory 1644 to third flight trajectory 1646, which may be defined by a first descending maneuver 1630, a first turning radius maneuver 1632, a second descending maneuver 1634, a second turning radius maneuver 1636, and a third descending maneuver 1638. In an example, the first turning radius maneuver 1632 and the second turning radius maneuver 1636 may represent more complex splines, polynomials or Bezier curves, or other motions. Similarly, third descending maneuver 1638 may comprise a more complex motion than the third descending maneuver 1618 or third descending maneuver 1628.

Accordingly, the air mobility platform 102 may simulate maneuvers based on aerial vehicle capabilities, real-world conditions, and/or other criteria. Moreover, the air mobility platform 102 may consider contingencies, such as increasingly desired trajectories over uninhabited areas for aerial vehicles that experience higher than average in-air failure rates. Further, the trajectory planning application 108*j* may cause the air mobility platform 102 to plan contingency routes, such as in the event of unanticipated impediments to execution of the approved flight plan once the aerial vehicle is in air.

By way of example, the trajectory planning application 108*j* may cause the air mobility platform 102 to perform trajectory planning utilizing maneuvers from the motions library 832 for a given aerial vehicle. In some embodiments, direct methods may be employed, such as utilizing movement primitives available for the aerial vehicle that are formulated to the mission specification as a numerical optimization. In some embodiments, a latticed-based approach may be performed within the full zone of operation, such as a lattice-system applied to encompass waypoints in a mission request. That is, in such a case a lattice, or grid, may be overlaid on the flight area, where a regular pattern of maneuvers of which the aerial vehicle is capable under the current or projected conditions may be laid out to operate within the acceptable boxes within the lattice.

Figure 17:
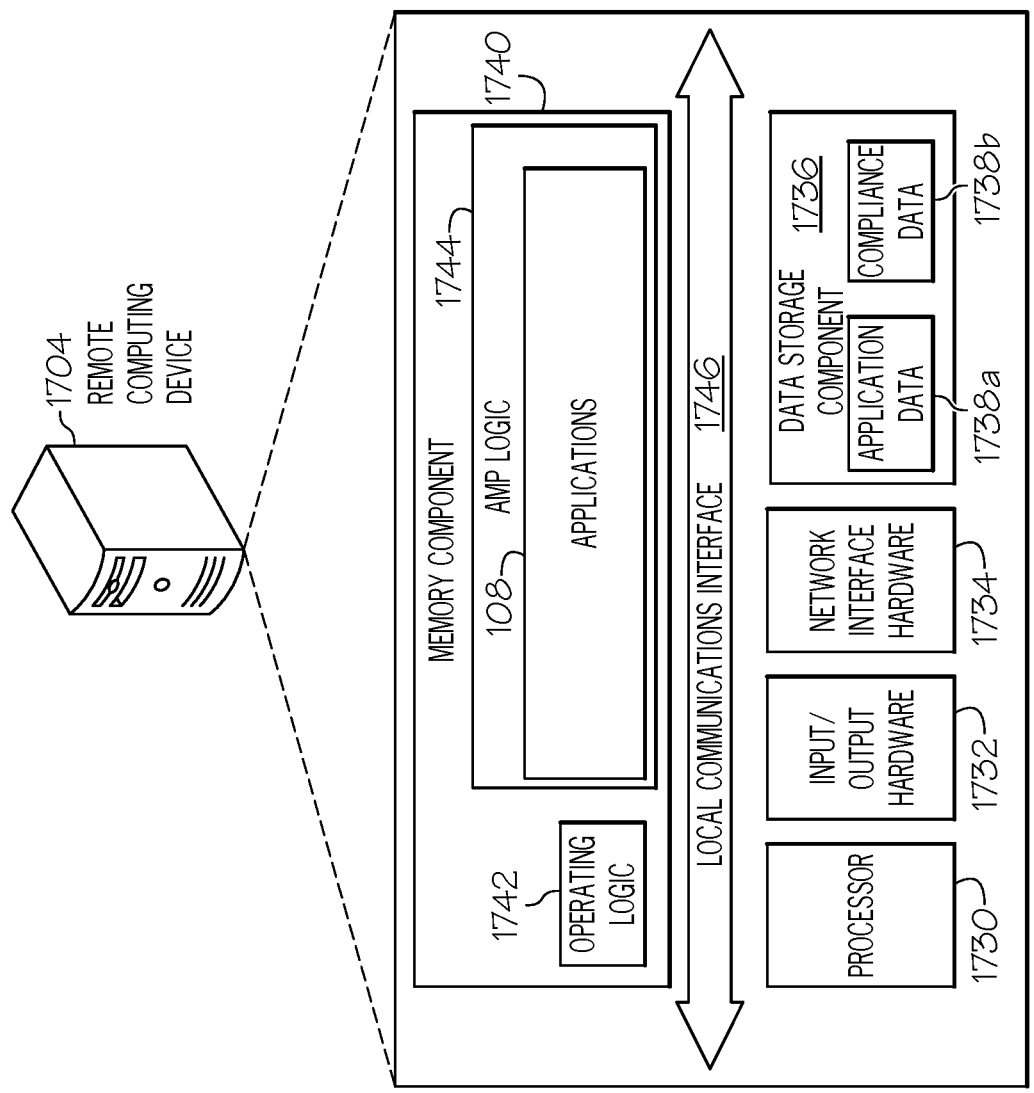
FIG. 17 depicts a computing environment for providing an aerial vehicle approval services platform, according to embodiments described herein.

FIG. 17 depicts a remote computing device 1704 that may be utilized for providing an aerial vehicle approval platform, according to embodiments provided herein. As illustrated, the remote computing device 1704 may be configured to provide the air mobility platform 102 and thus includes a processor 1730, input/output hardware 1732, network interface hardware 1734, a data storage component 1736, which stores application data 1738*a*, compliance data 1738*b*, and/or other data, and the memory component 1740. The application data 1738*a* may include airspace data, an approved waiver kit, registered aerial vehicle data, and approved aerial vehicle's data as described with reference to FIG. 2 and/or other data. The compliance data 1738*b* may include similar data that may be utilized to monitor compliance of the aerial vehicle 103, when in use. The memory component 1740 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 1704 and/or external to the remote computing device 1704.

The memory component 1740 may store operating system logic 1742 and air mobility platform logic 1744, which may include the applications 108 (FIG. 1). As illustrated, the air mobility platform logic 1744 may include a plurality of different pieces of logic, each of which may be embodied as a computer program or module, firmware, and/or hardware, as an example. A local interface 1746 is also included in FIG. 17 and may be implemented as a bus or other communication interface to facilitate communication among the components of the remote computing device 1704.

The processor 1730 may include any processing component operable to receive and execute instructions (such as from a data storage component 1736 and/or the memory component 1740). As described above, the input/output hardware 1732 may include and/or be configured to interface with the components of FIG. 17.

The network interface hardware 1734 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices. From this connection, communication may be facilitated between the remote computing device 1704 and other computing devices, such as those depicted herein.

The operating system logic 1742 may include an operating system and/or other software for managing components of the remote computing device 1704. As discussed above, the air mobility platform logic 1744 may reside in the memory component 1740 and may be configured to cause the processor 1730 to provide a platform for a user and/or administrator to submit an approval application, as described above. Similarly, the air mobility platform logic 1744 may be utilized to monitor operation of the aerial vehicle 103 to ensure compliance with the regulations for which the user and/or the aerial vehicle 103 were approved, and/or provide other similar functionality.

It should be understood that while the components in FIG. 17 are illustrated as residing within the remote computing device 1704, this is merely an example. In some embodiments, one or more of the components may reside external to the remote computing device 1704. It should also be understood that, while the remote computing device 1704 is illustrated as a single device, this is also merely an example. In some embodiments, the applications 108 may reside on different computing devices. As another example, one or more of the functionalities and/or components described herein may be provided by a remote computing device 1704 and/or other computing devices described herein. These devices may also include hardware and/or software for performing the functionality described herein.

Additionally, while the embodiments described herein are described with the applications 108 each as separate logical components, this is also an example. In some embodiments, a single piece of logic (or multiple pieces of logic) may cause the desired computing device to provide the described functionality.

In at least one example, the air mobility platform logic 1744 may allow for building of flight plans/mission requests by operators. A deconfliction node/application may insure proposed flight plans and trajectories do not conflict with terrain, other airspaces, other aerial vehicle, other flight plans, assets, structures, etc. A messaging node/application, may serve one or more environments of the air mobility platform to exchange messages. A conformance monitoring node/application, may be included and may check for telemetry conformance with a flight plan contract, and which may alert other systems and operators in the event of nonconformance. A suggestion/simulation node/application may be included, which may suggest alternative flight plans for those rejected by deconfliction. A USS gateway node/application may be included, which may serve as a search and discovery gateway. A push messaging node/application may be included, which may be enabled to send push notifications to particular applications. A constraint management node/application may be included, which may manage implications of modifications to current flight rules and restrictions. A controlled airspace node/application may be included, which may serve one or more environments of the air mobility platform to communicate regarding controlled airspaces. A partner services node/application may be provided, which may ingest third-party data, such as regarding weather, airspace, flight restrictions, flight rules, and so on, from trusted third party sources. One or more nodes/applications may be utilized as part of the air mobility platform.

For instance, user computing device 111 may interact with air mobility platform logic 1744 to receive information to form a mission specification and mission request for a particular aerial vehicle for a particular flight. The air mobility platform logic 1744 may include or identify takeoff and landing sites, particular specifications of the aerial vehicle, as well as mission objectives. Also represented may be available trajectories, such as maneuver sequences/libraries, geographical waypoints, autopilot data needs, communication methodologies available for a particular aerial vehicle, and so on.

In some embodiments, the user may provide input to a user interface, such as a user main menu interface 514*a* or other user interface 514. The multi-level bus 330 of the air mobility platform logic 1744 may process the input as described herein. The user may provide a mission specification identifying information specific to a planned or predicted planned flight of an aerial vehicle. The air mobility platform 102 may analyze the mission specification and may approve, modify, reject (e.g., fail), or otherwise process the mission specification. For example, the air mobility platform logic 1744 may cause the remote computing device 1704 to generate suggested solution trajectories for completion of a mission identified by the mission specification. Modifications may be presented for user approval or acceptance. In some embodiments, the remote computing device 1704 may provide an approved trajectory plan.

If the air mobility platform logic 1744 issues an approved trajectory plan, the user may accept the plan or modify the plan through the user interface 514. In another aspect, the air mobility platform logic 1744 may upload or provide the approved trajectory (e.g., flight plan) to necessary traffic management systems, such as unmanned air traffic management systems, ground control systems, and the like, such as using aspects of user interface 514. The air mobility platform logic 1744 may provide or upload the approved trajectory plan through direct communication or via a user device in communication with the aerial vehicle 103. In some embodiments, the communication may be provided over a network accessible via at least one level of the multi-level bus 330, and the aerial vehicle 103 may then perform flight maneuvers in accordance with the uploaded trajectory plan.

In the foregoing disclosure, it can be seen that various features are grouped together in a single embodiment for the purpose of clarity and brevity of the disclosure. This method of disclosure is not to be interpreted as reflecting an intention that the embodiments require more features than are expressly recited herein. Rather, the disclosure is to encompass all variations and modifications to the disclosed embodiments that would be understood to the skilled artisan in light of the disclosure.

Further aspects of the invention are provided by the subject matter of the following clauses:

A method for providing unmanned aerial vehicle trajectory planning comprising: receiving, by a computing device, a mission specification for fulfillment by an unmanned aerial vehicle, the mission specification identifying at least one waypoint, at least one optimization criterion, and information identifying the unmanned aerial vehicle, determining, by the computing device, whether one or more candidate flight trajectories are available, wherein determining whether or more candidate flight trajectories are available comprises modeling a plurality of maneuvers from a motions library that defines available maneuvers for the unmanned aerial vehicle to identify the one or more candidate flight trajectories to the at least one waypoint which satisfy at least one restriction condition and do not conflict with a flight plan for another aerial vehicle; in response to determining that one or more candidate flight trajectories are available, identifying, by the computing device, one or more desired flight trajectories from the one or more candidate flight trajectories that are determined to be available based on the at least one optimization criterion identified by the mission specification; and issuing, by the computing device, a mission approval that includes a selected flight trajectory of the one of the one or more desired flight trajectories as output to a receiving party.

A method of any of the preceding clauses, further comprising, providing, by the computing device and in response to determining that the one or more candidate flight trajectories are not available, a rejected mission request response to the receiving party.

A method of any of the preceding clauses, wherein the receiving party comprises at least one of a regulatory authority or a user computing device associated with the unmanned aerial vehicle.

A method of any of the preceding clauses, wherein the maneuvers comprise at least one of rectilinear motion, curved motion, takeoff maneuver, landing maneuver, spline curve, polynomial curve, or Bezier curve.

A method of any of the preceding clauses, further comprising developing the maneuvers as a function of historical trends in performance data corresponding to the unmanned aerial vehicle.

A method of any of the preceding clauses, further comprising determining that the one or more candidate flight trajectories satisfies the at least one restriction condition in response to identifying that the at least one restriction condition does not violate restricted airspace rules defining restrictions on flights within a geographical area.

A method of any of the preceding clauses, wherein the at least one optimization criterion identified by the mission specification comprises at least one of a quickest flight time, shortest path, lowest cost, lowest fuel, or energy use.

A method of any of the preceding clauses, wherein the mission specification identifies whether the at least one waypoint is required or not required.

A method of any of the preceding clauses, wherein the mission specification identifies constraints associated with the at least one waypoint.

A method of any of the preceding clauses, wherein the constraints comprise at least one of a time of arrival at the at least one waypoint, vehicle orientation at the at least one waypoint, or speed at the at least one waypoint.

A system for providing a trajectory planning application comprising: a remote computing device that includes a processor and a memory component that stores logic that, when executed by the processor, causes the system to perform at least the following: receive a mission specification for fulfillment by an unmanned aerial vehicle, the mission specification identifying at least one waypoint, at least one optimization criteria, and information identifying the unmanned aerial vehicle, determine whether one or more candidate flight trajectories are available, wherein determining that or more candidate flight trajectories are available comprises modeling a plurality of maneuvers from a motions library that defines available maneuvers for the unmanned aerial vehicle to identify the one or more candidate flight trajectories to the at least one waypoint which satisfy at least one restriction condition and do not conflict with a flight plan for at least one other aerial vehicle; in response to determining that one or more candidate flight trajectories are available, identify one or more desired flight trajectories from the one or more candidate flight trajectories that are determined to be available based on the at least one optimization criteria identified by the mission specification; and issue a mission approval that includes a selected flight trajectory of the one of the one or more desired flight trajectories as output to a receiving party.

A system of any of the preceding clauses, wherein the logic further causes the system to model the plurality of maneuvers under predicted weather conditions.

A system of any of the preceding clauses, wherein the logic further causes the system to in response to determining that the one or more candidate flight trajectories are not available, provide a rejected mission request response identifying a suggestion for modification of the mission specification to the receiving part.

A system of any of the preceding clauses, wherein issuing the mission approval further comprises identifying one or more of the at least one optimization criteria that is not satisfied by the selected flight trajectory.

A system of any of the preceding clauses, wherein the logic further causes the system to identify the one or more desired flight trajectories as the select flight trajectory in response to receiving a selection of the select flight trajectory from the receiving party.

A system of any of the preceding clauses, wherein the logic further causes the system to in response to receiving the selection of the select flight trajectory, validate that the selecting flight trajectory does not conflict with the flight plan for the at least one other aerial vehicle.

A non-transitory computer-readable medium that stores logic that, when executed by a computing device, causes the computing device to perform at least the following: receive a mission specification for fulfillment by an unmanned aerial vehicle, the mission specification identifying at least one waypoint, at least one optimization criteria, and information identifying the unmanned aerial vehicle, determine whether one or more candidate flight trajectories are available, wherein determining that or more candidate flight trajectories are available comprises modeling a plurality of maneuvers from a motions library that defines available maneuvers for the unmanned aerial vehicle to identify the one or more candidate flight trajectories to the at least one waypoint which satisfy at least one restriction condition and do not conflict with a flight plan for at least one other aerial vehicle; in response to determining that one or more candidate flight trajectories are available, identify one or more desired flight trajectories from the one or more candidate flight trajectories that are determined to be available based on the at least one optimization criteria identified by the mission specification; and issue a mission approval that includes a selected flight trajectory of the one of the one or more desired flight trajectories as output to a receiving party.

The—transitory computer-readable medium of any of the preceding clauses, wherein the logic further causes the computing device to modify, during fulfillment of the selected flight trajectory by the unmanned aerial vehicle, the selected flight trajectory of the unmanned aerial vehicle in response to identifying an emergency flight trajectory associated with the at least one other aerial vehicle.

The—transitory computer-readable medium of any of the preceding clauses, wherein the logic further causes the computing device to modify, during fulfillment of the selected flight trajectory by the unmanned aerial vehicle, the selected flight trajectory of the unmanned aerial vehicle in response to modeling the selected flight trajectory with an updated weather forecast. The—transitory computer-readable medium of any of the preceding clauses, wherein the logic further causes the computing device to modify, during fulfillment of the selected flight trajectory by the unmanned aerial vehicle, the selected flight trajectory of the unmanned aerial vehicle in response to determining that fuel consumption associated with the unmanned aerial vehicle exceeds a threshold fuel consumption.

The invention claimed is:

1. A method for providing unmanned aerial vehicle trajectory planning comprising:
   receiving, by a computing device, a mission specification for fulfillment by an unmanned aerial vehicle, the mission specification identifying at least one waypoint, at least one optimization criterion, and information identifying the unmanned aerial vehicle,
   identifying a plurality of native restriction conditions identified through a geographic mapping application presented via a user interface;
   identifying a plurality of non-native restriction conditions not specific to the mission specification;
   determining, by the computing device, whether one or more candidate flight trajectories are available, wherein determining whether one or more candidate flight trajectories are available comprises modeling a plurality of maneuvers from a motions library that defines available maneuvers for the unmanned aerial vehicle to identify the one or more candidate flight trajectories to the at least one waypoint which satisfy the native restriction conditions and the non-native restriction conditions and do not conflict with a flight plan for another aerial vehicle;
   in response to determining that one or more candidate flight trajectories are available,
   identifying, by the computing device, one or more desired flight trajectories from the one or more candidate flight trajectories that are determined to be available based on the at least one optimization criterion identified by the mission specification;
   issuing, by the computing device, a mission approval that includes a selected flight trajectory of the one of the one or more desired flight trajectories as output to a receiving party; and
   controlling the unmanned aerial vehicle according to the selected flight trajectory.

2. The method of claim 1, further comprising, providing, by the computing device and in response to determining that the one or more candidate flight trajectories are not available, a rejected mission request response to the receiving party.

3. The method of claim 1, wherein the receiving party comprises at least one of a regulatory authority or a user computing device associated with the unmanned aerial vehicle.

4. The method of claim 1, wherein the maneuvers comprise at least one of rectilinear motion, curved motion, takeoff maneuver, landing maneuver, spline curve, polynomial curve, or Bezier curve.

5. The method of claim 2, further comprising developing the maneuvers as a function of historical trends in performance data corresponding to the unmanned aerial vehicle.

6. The method of claim 1, further comprising determining that the one or more candidate flight trajectories satisfies the non-native restriction conditions in response to identifying that the non-native restriction conditions do not violate restricted airspace rules defining restrictions on flights within a geographical area.

7. The method of claim 1, wherein the at least one optimization criterion identified by the mission specification comprises at least one of a quickest flight time, shortest path, lowest cost, lowest fuel, or energy use.

8. The method of claim 1, wherein the mission specification identifies whether the at least one waypoint is required or not required.

9. The method of claim 1, wherein the mission specification identifies constraints associated with the at least one waypoint.

10. The method of claim 9, wherein the constraints comprise at least one of a time of arrival at the at least one waypoint, vehicle orientation at the at least one waypoint, or speed at the at least one waypoint.

11. A system for providing a trajectory planning application comprising:
a remote computing device that includes a processor and a memory component that stores logic that, when executed by the processor, causes the system to perform at least the following:
receive a mission specification for fulfillment by an unmanned aerial vehicle, the mission specification identifying at least one waypoint, at least one optimization criteria, and information identifying the unmanned aerial vehicle,
identify a plurality of native restriction conditions identified through a geographic mapping application presented via a user interface,
identify a plurality of non-native restriction conditions not specific to the mission specification,
determine whether one or more candidate flight trajectories are available, wherein determining that one or more candidate flight trajectories are available comprises modeling a plurality of maneuvers from a motions library that defines available maneuvers for the unmanned aerial vehicle to identify the one or more candidate flight trajectories to the at least one waypoint which satisfy the native restriction conditions and the non-native restriction conditions and do not conflict with a flight plan for at least one other aerial vehicle;
in response to determining that one or more candidate flight trajectories are available,
identify one or more desired flight trajectories from the one or more candidate flight trajectories that are determined to be available based on the at least one optimization criteria identified by the mission specification;
issue a mission approval that includes a selected flight trajectory of the one of the one or more desired flight trajectories as output to a receiving party; and
control the unmanned aerial vehicle according to the selected flight trajectory.

12. The system of claim 11, wherein the logic further causes the system to model the plurality of maneuvers under predicted weather conditions.

13. The system of claim 11, wherein the logic further causes the system to in response to determining that the one or more candidate flight trajectories are not available, provide a rejected mission request response identifying a suggestion for modification of the mission specification to the receiving party.

14. The system of claim 11, wherein issuing the mission approval further comprises identifying one or more of the at least one optimization criteria that is not satisfied by the selected flight trajectory.

15. The system of claim 11, wherein the logic further causes the system to identify the one or more desired flight trajectories as the selected flight trajectory in response to receiving a selection of the selected flight trajectory from the receiving party.

16. The system of claim 15, wherein the logic further causes the system to in response to receiving the selection of the selected flight trajectory, validate that the selected flight trajectory does not conflict with the flight plan for the at least one other aerial vehicle.

17. A non-transitory computer-readable medium that stores logic that, when executed by a computing device, causes the computing device to perform at least the following:
receive a mission specification for fulfillment by an unmanned aerial vehicle, the mission specification identifying at least one waypoint, at least one optimization criteria, and information identifying the unmanned aerial vehicle,
identify a plurality of native restriction conditions identified through a geographic mapping application presented via a user interface;
identify a plurality of non-native restriction conditions not specific to the mission specification;
determine whether one or more candidate flight trajectories are available, wherein determining that one or more candidate flight trajectories are available comprises modeling a plurality of maneuvers from a motions library that defines available maneuvers for the unmanned aerial vehicle to identify the one or more candidate flight trajectories to the at least one waypoint which satisfy the native restriction conditions and the non-native restriction conditions and do not conflict with a flight plan for at least one other aerial vehicle;
in response to determining that one or more candidate flight trajectories are available,
identify one or more desired flight trajectories from the one or more candidate flight trajectories that are determined to be available based on the at least one optimization criteria identified by the mission specification;
issue a mission approval that includes a selected flight trajectory of the one of the one or more desired flight trajectories as output to a receiving party; and
control the unmanned aerial vehicle according to the selected flight trajectory.

18. The non-transitory computer-readable medium of claim 17, wherein the logic further causes the computing device to
modify, during fulfillment of the selected flight trajectory by the unmanned aerial vehicle, the selected flight trajectory of the unmanned aerial vehicle in response to identifying an emergency flight trajectory associated with the at least one other aerial vehicle.

19. The non-transitory computer-readable medium of claim 17, wherein the logic further causes the computing device to
modify, during fulfillment of the selected flight trajectory by the unmanned aerial vehicle, the selected flight trajectory of the unmanned aerial vehicle in response to modeling the selected flight trajectory with an updated weather forecast.

20. The non-transitory computer-readable medium of claim 17, wherein the logic further causes the computing device to
modify, during fulfillment of the selected flight trajectory by the unmanned aerial vehicle, the selected flight trajectory of the unmanned aerial vehicle in response to determining that fuel consumption associated with the unmanned aerial vehicle exceeds a threshold fuel consumption.

* * * * *